US010945182B2

(12) United States Patent
Hassan

(10) Patent No.: US 10,945,182 B2
(45) Date of Patent: *Mar. 9, 2021

(54) SYSTEM FOR WIRELESS CONNECTIVITY CONTINUITY AND QUALITY

(71) Applicant: Blue Ocean Robotics ApS, Odense (DK)

(72) Inventor: Scott W. Hassan, Menlo Park, CA (US)

(73) Assignee: Blue Ocean Robotics ApS, Odense (DK)

( * ) Notice: Subject to any disclaimer, the term of this patent is extended or adjusted under 35 U.S.C. 154(b) by 0 days.

This patent is subject to a terminal disclaimer.

(21) Appl. No.: 15/964,671

(22) Filed: Apr. 27, 2018

(65) Prior Publication Data

US 2018/0317152 A1 Nov. 1, 2018

Related U.S. Application Data

(63) Continuation of application No. 15/276,766, filed on Sep. 26, 2016, now abandoned, which is a
(Continued)

(51) Int. Cl.
*H04W 36/30* (2009.01)
*H04W 36/18* (2009.01)
(Continued)

(52) U.S. Cl.
CPC .......... *H04W 36/30* (2013.01); *H04W 36/18* (2013.01); *H04W 48/16* (2013.01); *H04W 48/20* (2013.01); *H04W 84/12* (2013.01); *H04W 88/08* (2013.01)

(58) Field of Classification Search
CPC ..... H04W 36/30; H04W 36/14; H04W 36/08; H04W 88/06; H04W 48/18;
(Continued)

(56) References Cited

U.S. PATENT DOCUMENTS 5,448,569 A 9/1995 Huang et al.
5,465,083 A 11/1995 Okamoto
(Continued)

FOREIGN PATENT DOCUMENTS

EP 1175034 A2 1/2002

OTHER PUBLICATIONS

International Search Report and Written Opinion dated Jun. 17, 2013, International Patent Application No. PCT/US2013/035678, International Filing Date: Apr. 8, 2013.
(Continued)

*Primary Examiner* — Ricardo H Castaneyra
(74) *Attorney, Agent, or Firm* — Butzel Long

(57) ABSTRACT

Configurations are described for maintaining a continuity and quality of wireless signal connection between a mobile device and systems accessible through the internet. In particular, configurations are disclosed to address the challenge of a mobile device that moves through a physical environment wherein the best wireless connectivity performance is achieved by switching between available connection sources and constantly evaluating a primary connection with other available connections that may be switched in to become a new primary connection. The mobile device may be self-propelled or carried by some other mobilizing means.

22 Claims, 35 Drawing Sheets

Related U.S. Application Data continuation of application No. 13/858,896, filed on Apr. 8, 2013, now abandoned.

(60) Provisional application No. 61/621,427, filed on Apr. 6, 2012.

(51) Int. Cl.
*H04W 48/16* (2009.01)
*H04W 48/20* (2009.01)
*H04W 84/12* (2009.01)
*H04W 88/08* (2009.01)

(58) Field of Classification Search
CPC ... H04W 76/045; H04W 76/00; H04W 76/25; H04W 84/12; H04W 84/18; H04W 84/047; H04W 24/08; H04W 24/02; H04W 48/20; H04W 48/16; H04W 36/18; H04L 43/50; H04L 69/18
See application file for complete search history.

(56) References Cited

U.S. PATENT DOCUMENTS

| | | |
|---|---|---|
| 5,654,959 A | 8/1997 | Baker et al. |
| 6,292,660 B1 | 9/2001 | Hartless et al. |
| 6,768,721 B1 | 7/2004 | Schmitz et al. |
| 7,031,726 B2 | 4/2006 | Cheng |
| 7,123,917 B2 | 10/2006 | Kalhan et al. |
| 7,408,899 B1 | 8/2008 | Latvakoski |
| 7,643,051 B2 | 1/2010 | Sandberg et al. |
| 7,768,959 B1 | 8/2010 | Chen et al. |
| 7,873,377 B1 | 1/2011 | Cocos |
| 8,045,996 B2 | 10/2011 | Brunner et al. |
| 8,078,207 B2 | 12/2011 | Burns et al. |
| 8,204,029 B2 | 6/2012 | Stephenson et al. |
| 8,233,452 B2 | 7/2012 | Makhijani et al. |
| 8,238,268 B1 | 8/2012 | Shmidt |
| 8,265,793 B2 | 9/2012 | Cross et al. |
| 8,270,369 B1 | 9/2012 | Chang |
| 8,737,351 B2 | 5/2014 | Forte et al. |
| 8,751,043 B2 | 6/2014 | Guo et al. |
| 8,848,608 B1 | 9/2014 | Addepalli et al. |
| 8,964,550 B1 | 2/2015 | Chhabra |
| 9,344,935 B2 | 5/2016 | Hassan |
| 9,375,843 B2 | 6/2016 | Wang et al. |
| 2002/0068588 A1 | 6/2002 | Yoshida et al. |
| 2002/0085516 A1 | 7/2002 | Bridgelall |
| 2002/0085719 A1 | 7/2002 | Crosbie |
| 2002/0131378 A1 | 9/2002 | Korinek et al. |
| 2003/0076785 A1 | 4/2003 | Purpura |
| 2003/0219001 A1 | 11/2003 | de Prado Pavon et al. |
| 2004/0039817 A1 | 2/2004 | Lee et al. |
| 2004/0090924 A1 | 5/2004 | Giaimo et al. |
| 2004/0148411 A1 | 7/2004 | Blawat et al. |
| 2004/0227731 A1 | 11/2004 | Gould Bear et al. |
| 2005/0003827 A1 | 1/2005 | Whelan |
| 2005/0037787 A1 | 2/2005 | Bachner, III et al. |
| 2005/0047344 A1 | 3/2005 | Seol |
| 2005/0058112 A1 | 3/2005 | Lahey et al. |
| 2005/0134716 A1 | 6/2005 | Vice |
| 2005/0135310 A1 | 6/2005 | Cromer et al. |
| 2005/0197136 A1 | 9/2005 | Friday et al. |
| 2006/0029061 A1 | 2/2006 | Pister et al. |
| 2006/0068782 A1 | 3/2006 | Kuriyama |
| 2006/0072507 A1 | 4/2006 | Chandra et al. |
| 2006/0094400 A1 | 5/2006 | Beachem et al. |
| 2006/0104232 A1 | 5/2006 | Gidwani |
| 2006/0176169 A1 | 8/2006 | Doolin et al. |
| 2006/0227761 A1 | 10/2006 | Scott et al. |
| 2006/0229090 A1 | 10/2006 | LaDue |
| 2006/0292996 A1 | 12/2006 | Malasani et al. |
| 2007/0008918 A1 | 1/2007 | Stanforth |
| 2007/0061041 A1 | 3/2007 | Zweig |
| 2007/0064092 A1 | 3/2007 | Sandberg et al. |
| 2007/0085822 A1 | 4/2007 | Lagnado |
| 2007/0105600 A1 | 5/2007 | Mohanty et al. |
| 2007/0109993 A1 | 5/2007 | Beach |
| 2007/0140163 A1 | 6/2007 | Meier et al. |
| 2007/0177549 A1 | 8/2007 | Lo et al. |
| 2007/0201420 A1 | 8/2007 | Tejaswini et al. |
| 2007/0240163 A1 | 10/2007 | Conrad et al. |
| 2007/0243832 A1 | 10/2007 | Park et al. |
| 2007/0250212 A1 | 10/2007 | Halloran et al. |
| 2007/0258508 A1 | 11/2007 | Werb et al. |
| 2008/0062940 A1 | 3/2008 | Othmer et al. |
| 2008/0113666 A1 | 5/2008 | Monte et al. |
| 2008/0123682 A1 | 5/2008 | Yackoski et al. |
| 2008/0186917 A1 | 8/2008 | Wu et al. |
| 2008/0192699 A1 | 8/2008 | Rue |
| 2008/0198811 A1 | 8/2008 | Deshpande et al. |
| 2008/0215766 A1 | 9/2008 | Stobbe et al. |
| 2008/0273486 A1 | 11/2008 | Pratt et al. |
| 2008/0285520 A1 | 11/2008 | Forte et al. |
| 2008/0310371 A1 | 12/2008 | Russell |
| 2009/0011773 A1 | 1/2009 | Balachandran et al. |
| 2009/0103503 A1 | 4/2009 | Chhabra et al. |
| 2009/0154426 A1 | 6/2009 | Perraud et al. |
| 2009/0165114 A1 | 6/2009 | Baum et al. |
| 2009/0219849 A1 | 9/2009 | Alpert et al. |
| 2009/0281676 A1 | 11/2009 | Beavis et al. |
| 2009/0286534 A1 | 11/2009 | Garg et al. |
| 2009/0290555 A1 | 11/2009 | Alpert et al. |
| 2010/0076600 A1 | 3/2010 | Cross et al. |
| 2010/0080163 A1 | 4/2010 | Krishnamoorthi et al. |
| 2010/0118830 A1 | 5/2010 | Stephenson et al. |
| 2010/0157864 A1 | 6/2010 | Salomone et al. |
| 2010/0214082 A1 | 8/2010 | Covaro et al. |
| 2010/0302968 A1 | 12/2010 | Lu et al. |
| 2010/0317371 A1 | 12/2010 | Westerinen et al. |
| 2011/0006991 A1 | 1/2011 | Elias |
| 2011/0013552 A1 | 1/2011 | Ali et al. |
| 2011/0021231 A1 | 1/2011 | Burns et al. |
| 2011/0096739 A1 | 4/2011 | Heidari et al. |
| 2011/0128378 A1 | 6/2011 | Raji |
| 2011/0141970 A1 | 6/2011 | Juan et al. |
| 2011/0172822 A1 | 7/2011 | Ziegler et al. |
| 2011/0189995 A1 | 8/2011 | Tinnakornsrisuphap et al. |
| 2011/0211511 A1 | 9/2011 | Bakthavathsalu |
| 2011/0222448 A1 | 9/2011 | Ofek et al. |
| 2011/0222523 A1 | 9/2011 | Fu et al. |
| 2011/0223885 A1 | 9/2011 | Salkintzis et al. |
| 2011/0228751 A1 | 9/2011 | Takagi et al. |
| 2011/0282962 A1 | 11/2011 | Suzuki |
| 2011/0288684 A1 | 11/2011 | Farlow et al. |
| 2012/0224481 A1 | 9/2012 | Babiarz et al. |
| 2012/0224743 A1 | 9/2012 | Rodriquez |
| 2013/0142062 A1 | 6/2013 | Dinan |
| 2013/0150012 A1 | 6/2013 | Chhabra et al. |
| 2013/0242940 A1 | 9/2013 | Jones et al. |
| 2013/0279411 A1 | 10/2013 | Gassend |
| 2013/0279472 A1 | 10/2013 | Gassend |
| 2013/0279479 A1 | 10/2013 | Gassend |
| 2013/0288675 A1 | 10/2013 | Gassend |
| 2013/0288686 A1 | 10/2013 | Chou |
| 2013/0343352 A1 | 12/2013 | Hassan |
| 2014/0128115 A1 | 5/2014 | Siomina et al. |

OTHER PUBLICATIONS

Non Final Office Action dated Jun. 22, 2017, U.S. Appl. No. 15/391,597, (10 pages).

Final Office Action dated Jun. 21, 2018, U.S. Appl. No. 13/858,898, (25 pages).

Non Final Office Action dated Jul. 12, 2018, U.S. Appl. No. 15/296,975, (9 pages).

Non Final Office Action dated Jul. 13, 2018, U.S. Appl. No. 15/660,886, (34 pages).

Final Office Action dated Jul. 30, 2019, U.S. Appl. No. 16/231,072, (26 pages).

Non Final Office Action dated Jul. 29, 2019, U.S. Appl. No. 16/157,218, (24 pages).

Figure 1G
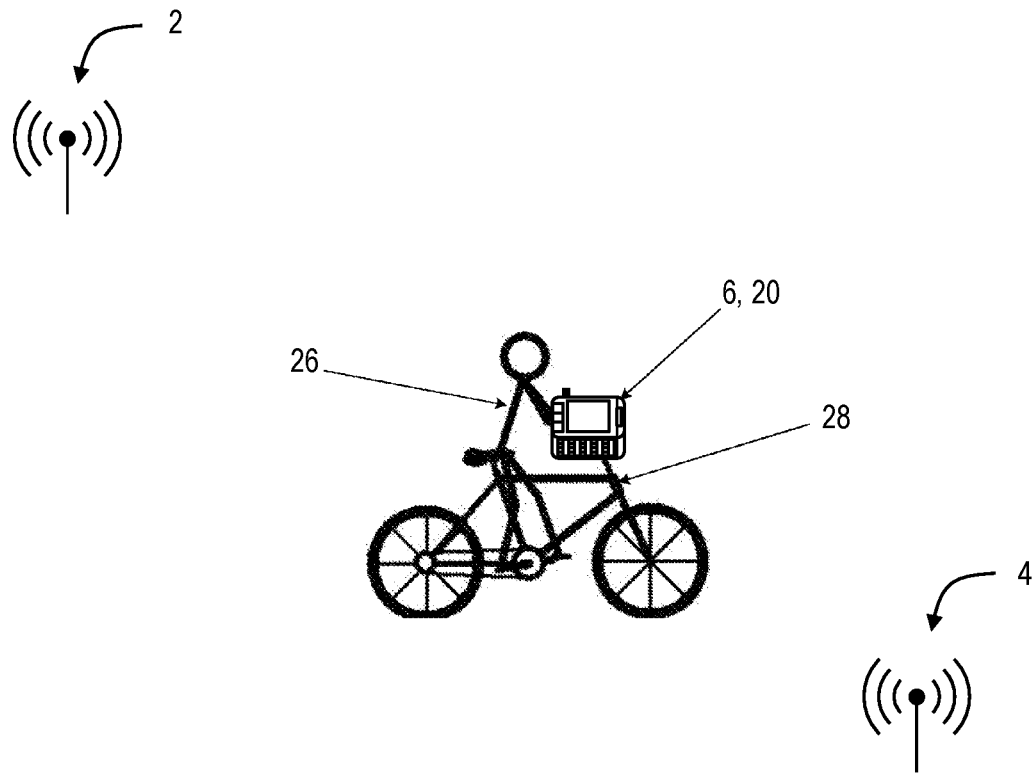
Figure 1H
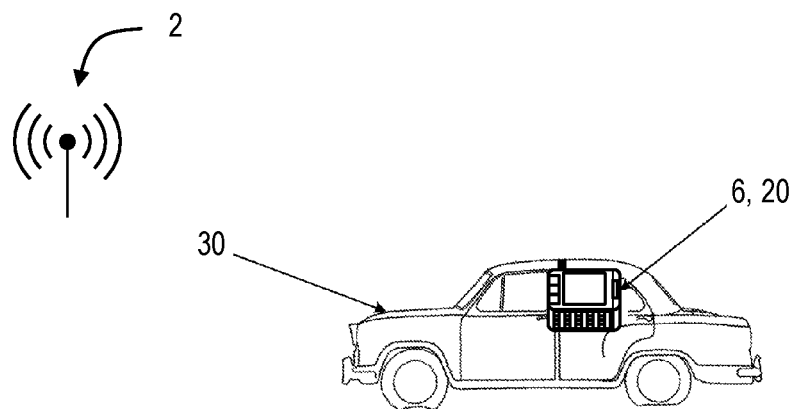
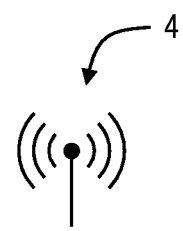

Figure 1I
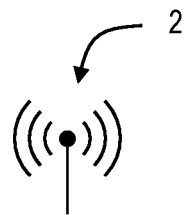
2
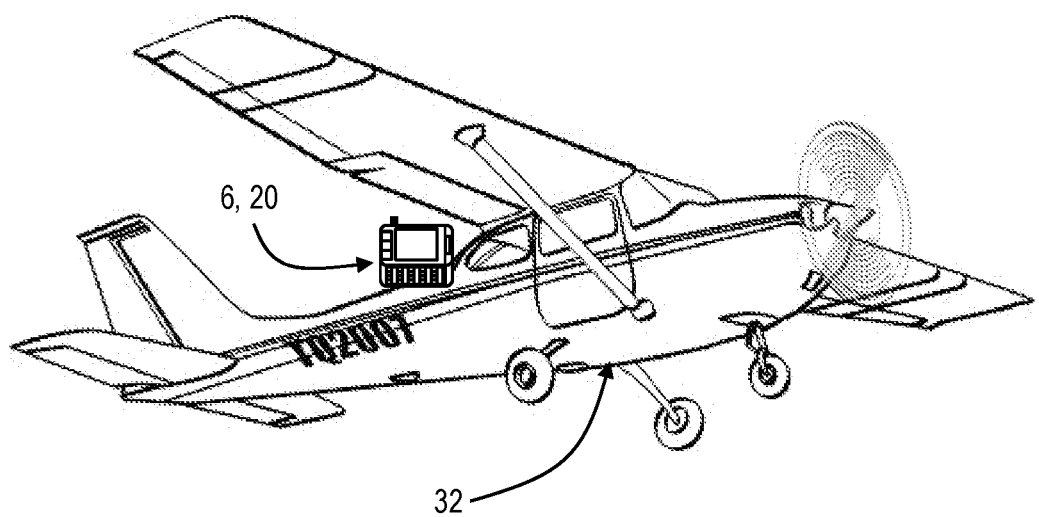
6, 20
32
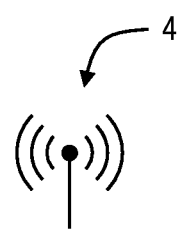
4

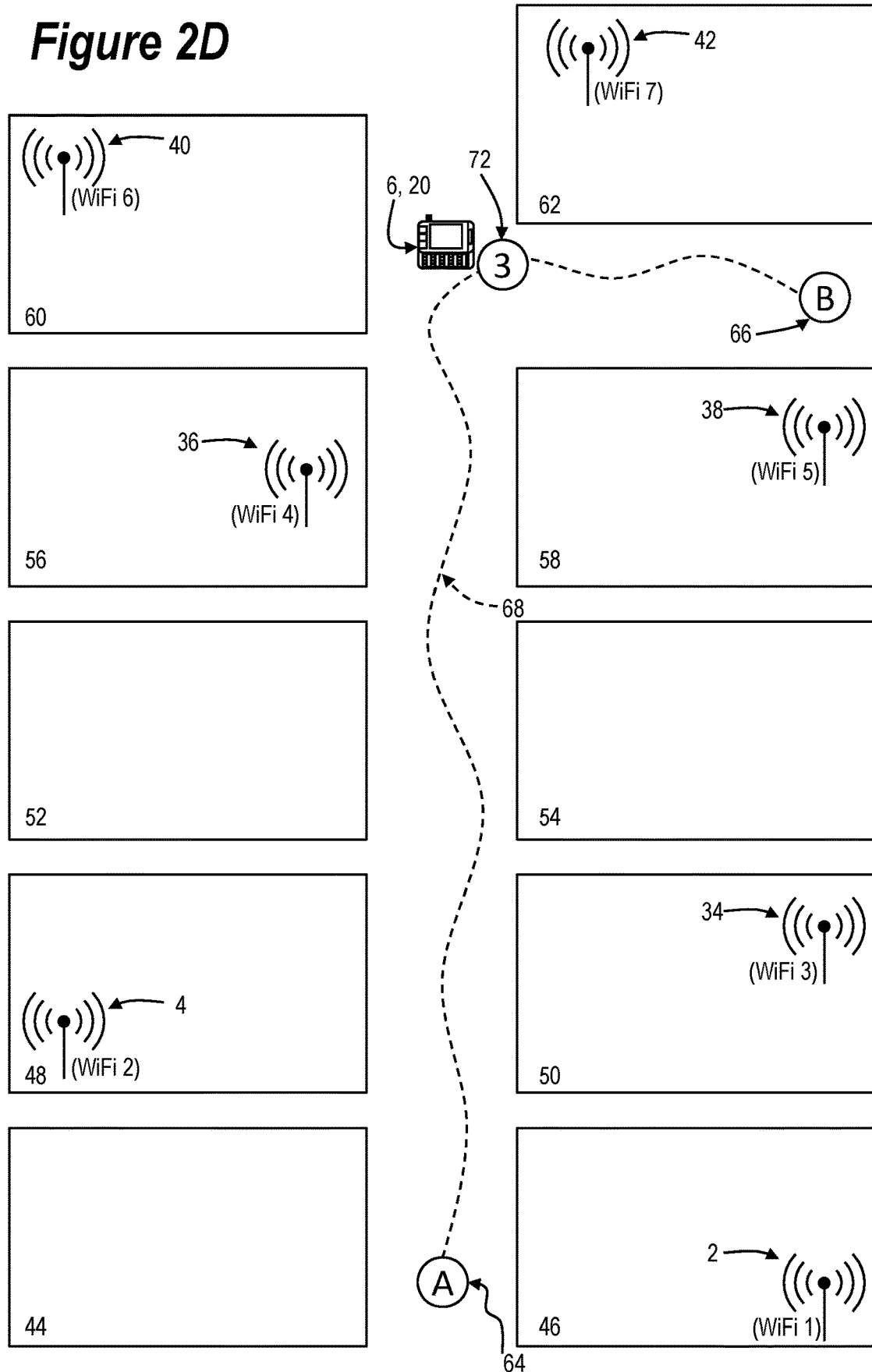

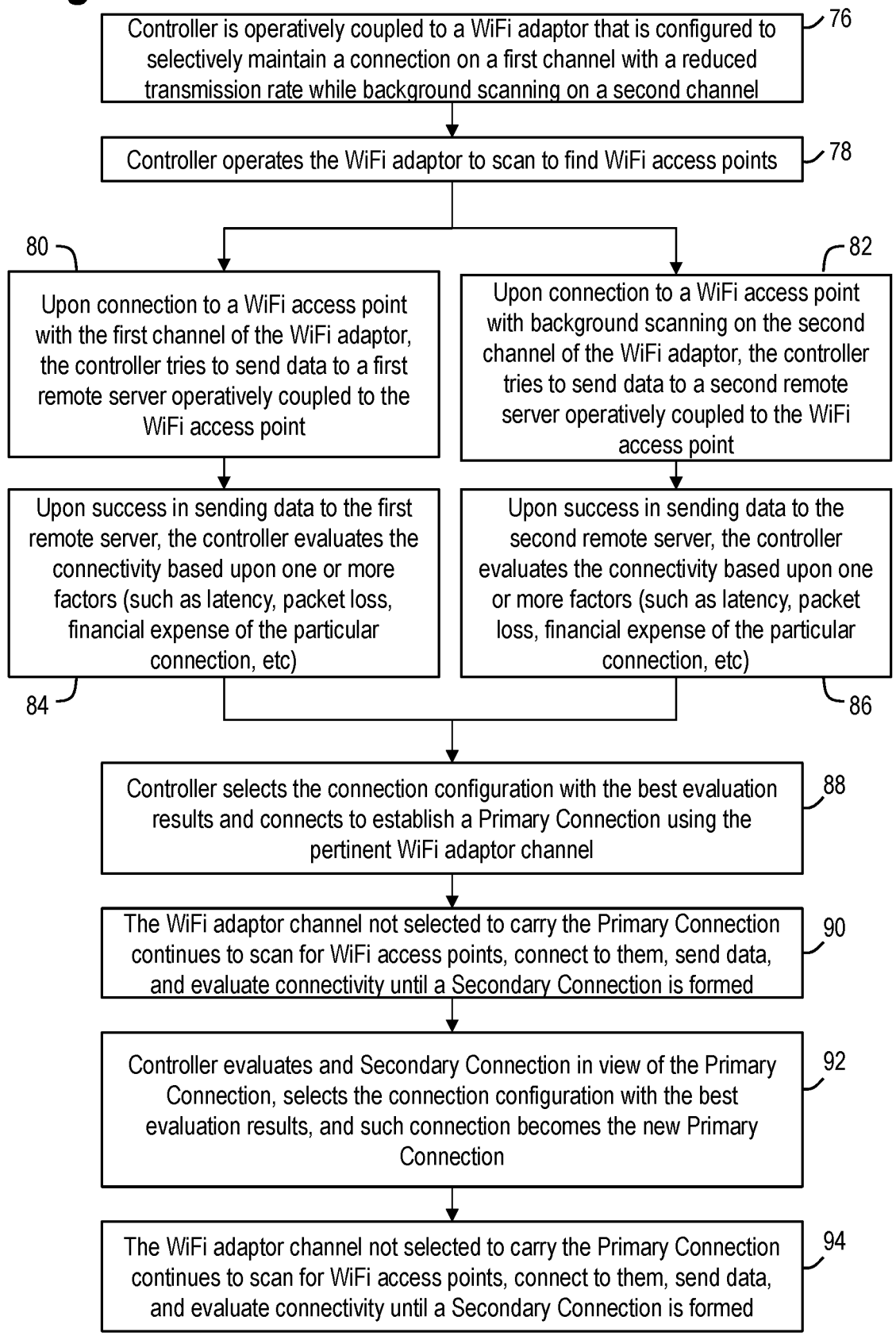

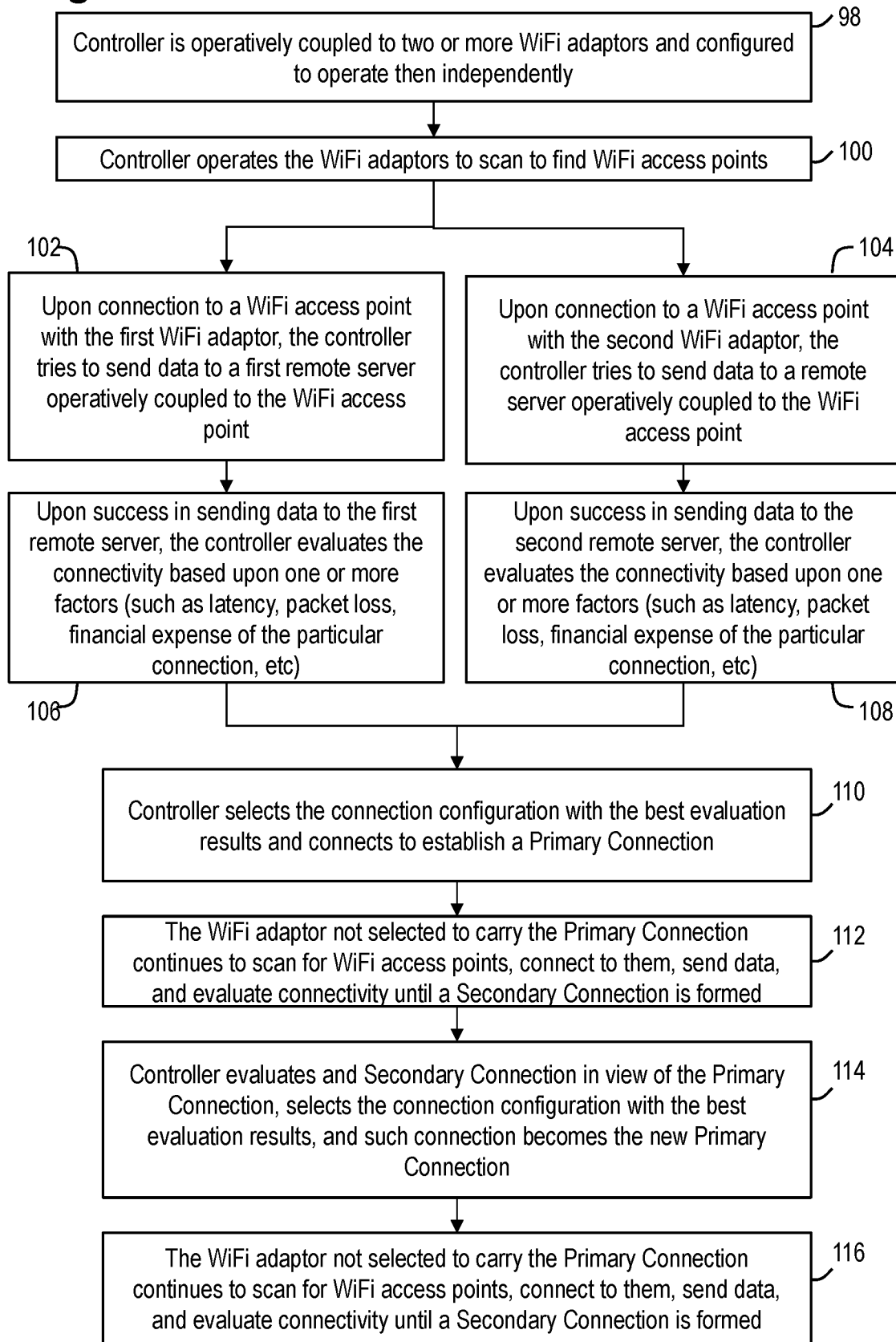

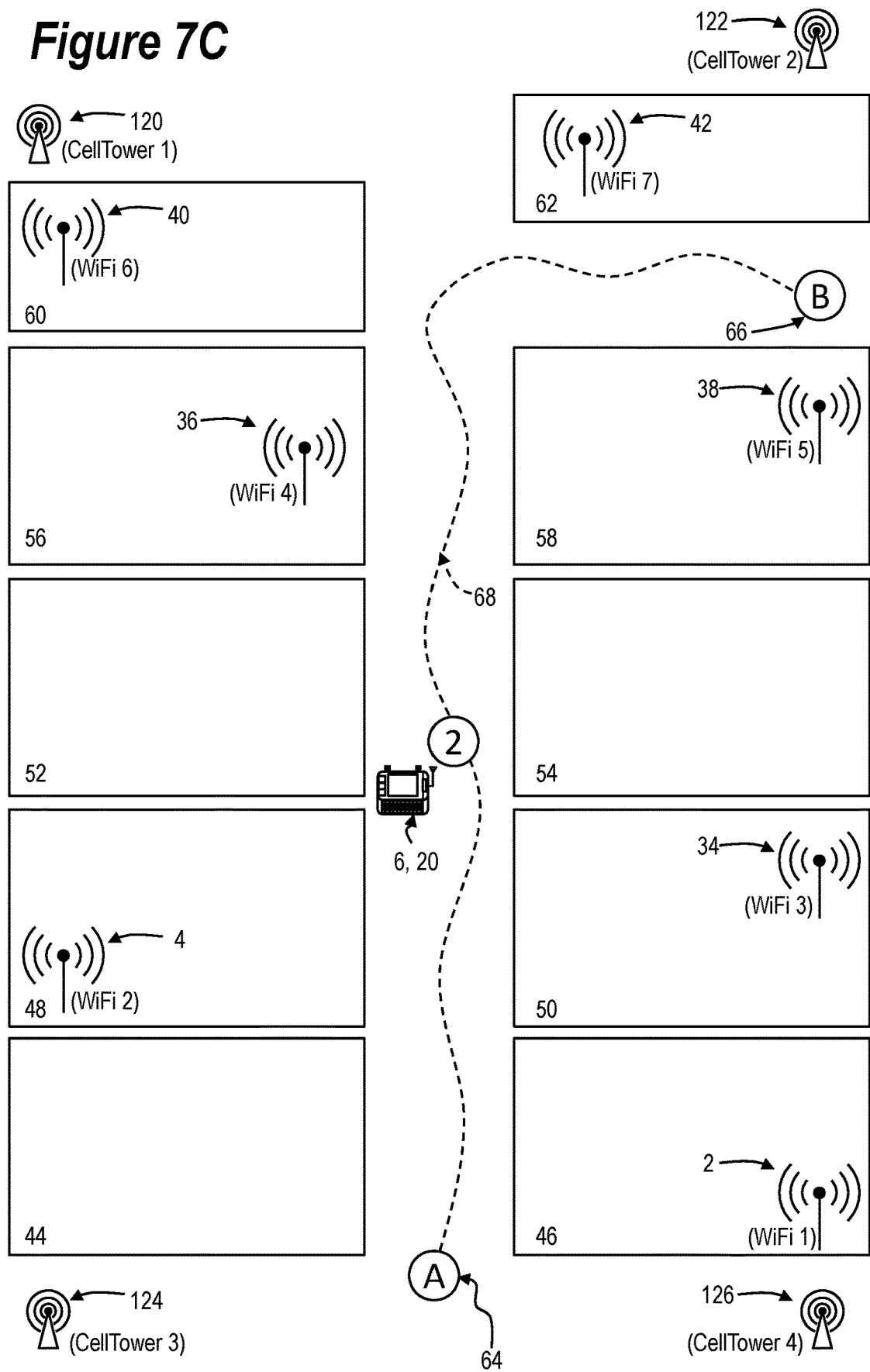

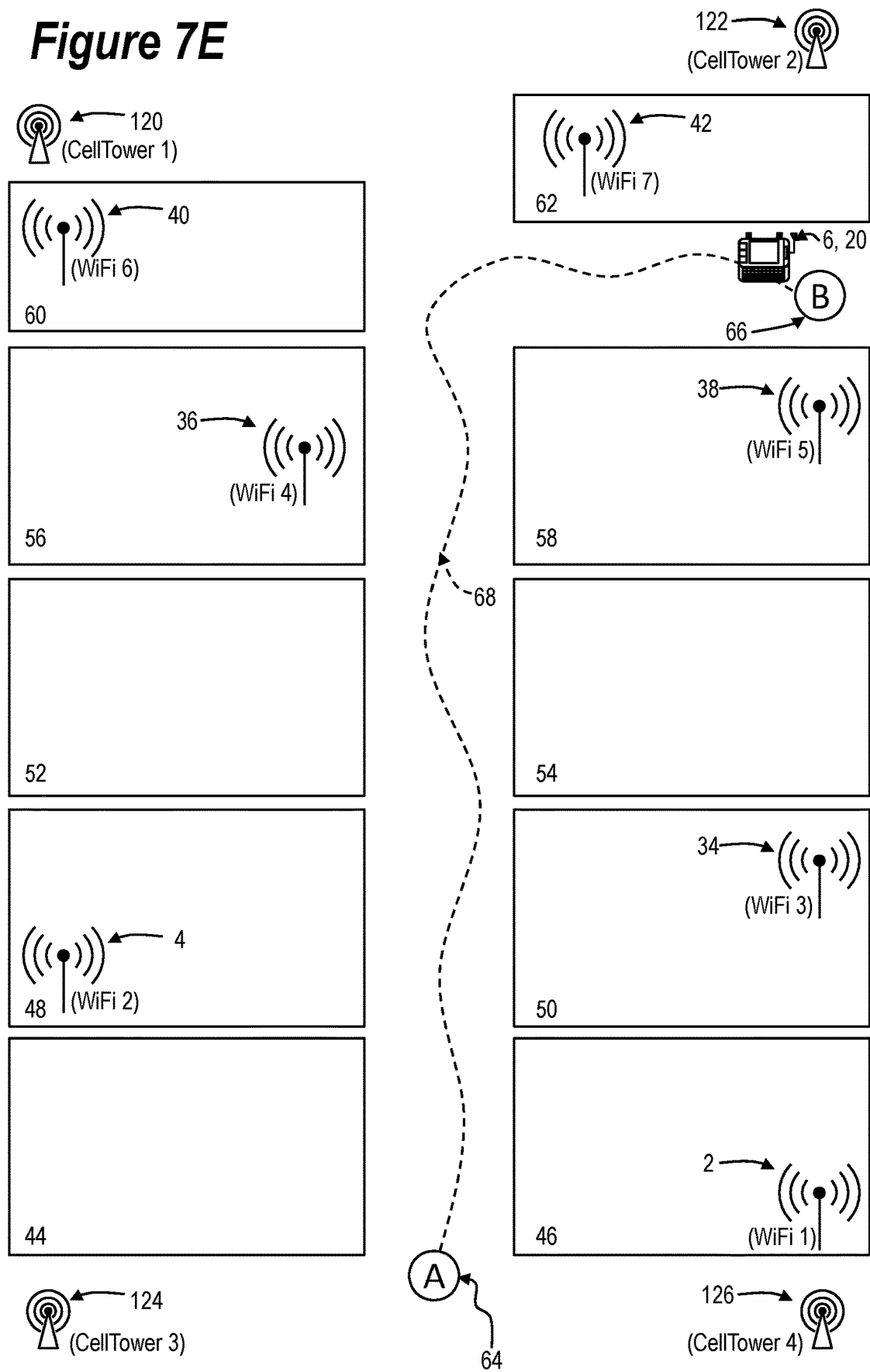

SYSTEM FOR WIRELESS CONNECTIVITY CONTINUITY AND QUALITY

RELATED APPLICATION DATA

The present application is a continuation of U.S. patent application Ser. No.: 15/276,766, filed on Sep. 26, 2016, which is a continuation of U.S. patent application Ser. No.: 13/858,896, filed on Apr. 8, 2013 now abandoned, which claims the benefit under 35 U.S.C. § 119 to U.S. Provisional Application Ser. No. 61/621,427 filed Apr. 6, 2012. The foregoing applications are hereby incorporated by reference into the present application in their entirety.

FIELD OF THE INVENTION

The present invention relates generally to wireless connectivity of computing and controlling systems to each other, and more particularly to configurations for switching between connectivity partnering sources at relatively high frequency to both discover and utilize updated wireless partnering relationships as a mobile device is moved around relative to the sources.

BACKGROUND

There are many types of mobile computing systems designed to be connected to other systems via wireless communication. For example, relative basic systems such as that marketed under the tradename iPod Touch® by Apple Computer of Cupertino, Calif., are designed to browse the internet through Wi-Fi,® (Wi-Fi Alliance® of Austin, Tex.), connectivity as they are carried about by a user. On the more complex side, various mobile computing systems are available that incorporate not only Wi-Fi type connectivity, but also wireless mobile network connectivity, such as via a cellmodem. The presently available systems are not particularly good at maintaining connectivity, as the users of cellphones, cellmodems, and Wi-Fi-connected systems have experienced when moving about with the systems, such as by moving in a car or even walking about from one location in a building to another location in the same building. Typically what happens is that the connectivity becomes interrupted or dropped, and the user finds himself trying to regain connectivity, generally by redialing or using software utilities to attempt reconnection. Indeed, notwithstanding the millions of mobile communication and computing devices, such as laptops and iPhone Touch® devices, sold in the U.S. and other countries, there remains a lack of solutions for connectivity robustness, and almost any consumer of technologies can point to the numerous times he or she has dropped a signal at an inconvenient moment, only to have to try to regain connectivity manually. There is a need for systems and methods configured to automatically assist with seeking out, testing, utilizing, and upgrading wireless connectivity in real or near-real time at a frequency high enough to make the overall connectivity scenario relatively robust.

SUMMARY

One embodiment is directed to a system for maintaining wireless connectivity between a mobile controller and a remote controller, comprising: first and second wireless adaptors operatively coupled to the mobile controller and configured to operate independently such that one may be scanning for a connection between the mobile controller and the remote controller while the other retains a connection between the mobile controller and the remote controller; wherein the mobile controller is configured to operate the wireless adaptors to automatically: scan to find available wireless access points and check the signal strength thereof; connect with the available wireless access point that has the strongest signal strength using the first wireless adaptor; while retaining connectivity with the remote controller through the first wireless adaptor, continue scanning using the second wireless adaptor to try to find an alternative access point and check the signal strength thereof; compare the signal strength of the access point connected through the first wireless adaptor with the signal strength of the alternative access point available through the second wireless; and maintain connectivity between the mobile controller and remote controller through the wireless adaptor associated with the access point that has the highest signal strength. Each of the first and second wireless adaptors may have a single wireless transmitter. The single wireless transmitter may be an RF antenna. In a background scanning mode, data is alternated through one of the single wireless transmitters from both a first channel and a second channel. The wireless adaptor may be compatible with an IEEE 802.11 standard selected from the group consisting of: 802.11A, 802.11B, 802.11G, and 802.11N. The wireless adaptor may be a cellular telephone adaptor. The wireless adaptor may be an IEEE 802.16 compatible adaptor. The wireless adaptor may be a free-space optical adaptor. The mobile controller may be configured to operate the wireless adaptors to scan using a discrete frequency band. The discrete frequency band may be selected based upon a determined prevalence of active wireless access points. The mobile controller may be configured to scan again to find available wireless access points after disconnecting connectivity between the mobile controller and remote controller through the lowest evaluated connection. The mobile controller may be configured to repeatedly cycle between scanning to find available wireless access points and disconnecting connectivity between the mobile controller and remote controller through the lowest evaluated connection. The mobile controller may be configured to repeatedly cycle at a frequency between about 100 cycles/second and about ½ cycles/second. The mobile controller may be coupled to a motorized vehicle. The motorized vehicle may comprise a robot. The mobile controller may be configured to evaluate the connectivity of the connection with the first or second channel based at least in part upon a factor selected from the group consisting of: latency, packet loss, and financial cost of connectivity. The system may further comprise a third wireless adaptor operatively coupled to the mobile controller and configured to operate independently of the other two adaptors. The mobile controller may be configured to connect to the remote controller through all three wireless adaptors via different wireless access points, evaluate connectivity through each, and maintain connectivity only through the highest evaluated connection. The first and second wireless adaptors may be compatible with an IEEE 802.11 standard selected from the group consisting of: 802.11A, 802.11B, 802.11G, and 802.11N. The third wireless adaptor may be a cellular telephone adaptor. The mobile controller further may be configured to operate the wireless adaptors to automatically disconnect connectivity between the mobile controller and remote controller through the lowest evaluated connection.

BRIEF DESCRIPTION OF THE DRAWINGS

FIGS. 1A-1I depict embodiments of computing systems which may be connected to the internet or other computing systems using one or more wireless transceivers.

FIGS. 2A-2E depict an embodiment wherein a mobile computing system connected via one or more wireless technologies is moved through an environment that has a plurality of Wi-Fi adaptors in various locations.

FIG. 3 depicts one embodiment of the invention wherein a Wi-Fi adaptor capable of background scanning on a second channel may be utilized to improve connectivity robustness and quality.

FIG. 5 depicts one embodiment of the invention wherein a controller coupled to two or more Wi-Fi adaptors may be utilized to improve connectivity robustness and quality.

FIGS. 7A-7E depict an embodiment wherein a mobile computing system connected via one or more wireless technologies and one or more cellular wireless adaptors is moved through an environment that has a plurality of Wi-Fi adaptors and cellular transceiver systems in various locations.

DETAILED DESCRIPTION

Figure 1A:
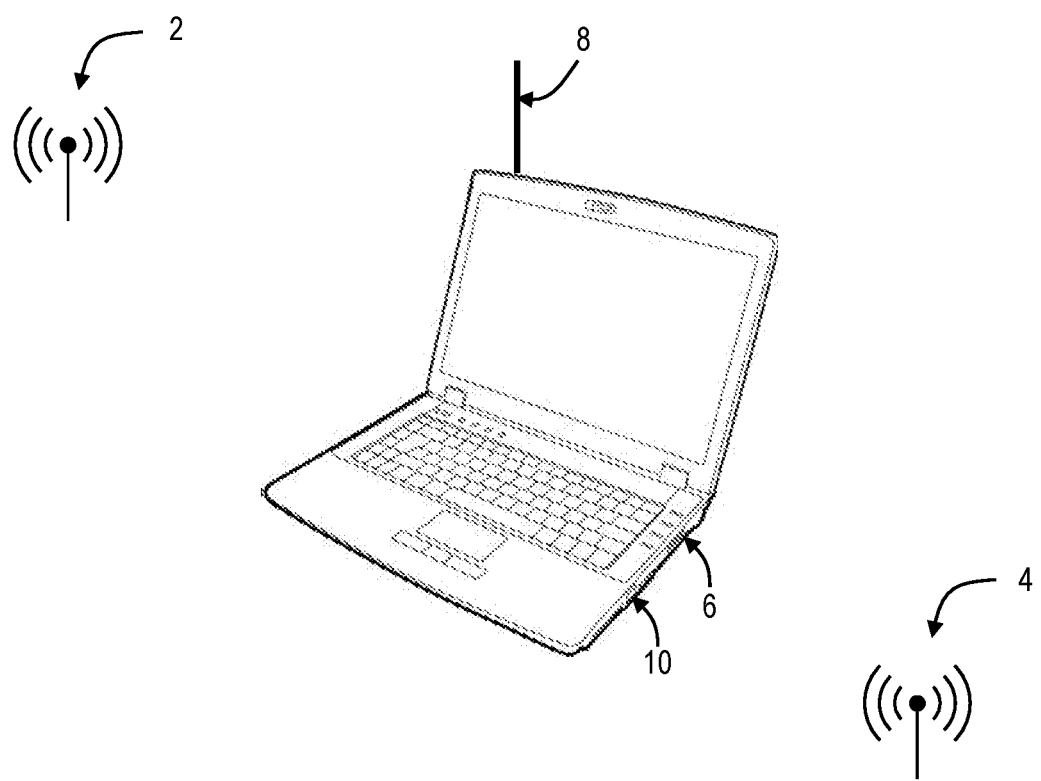
Figure 1B:
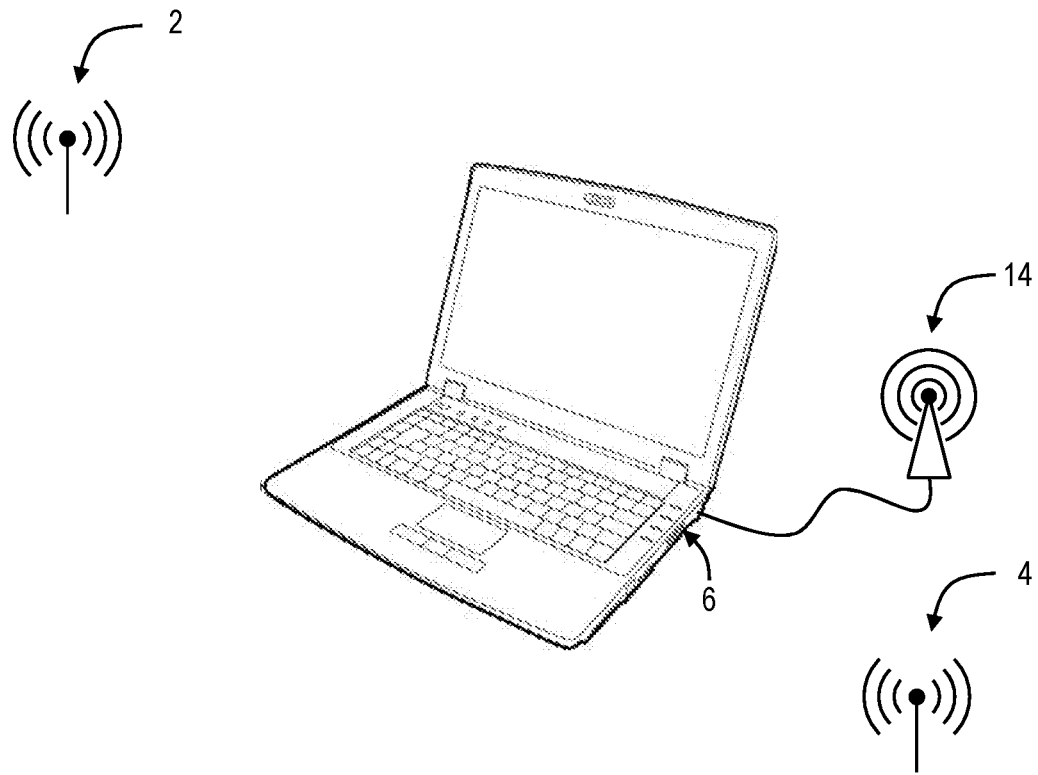
Figure 1C:
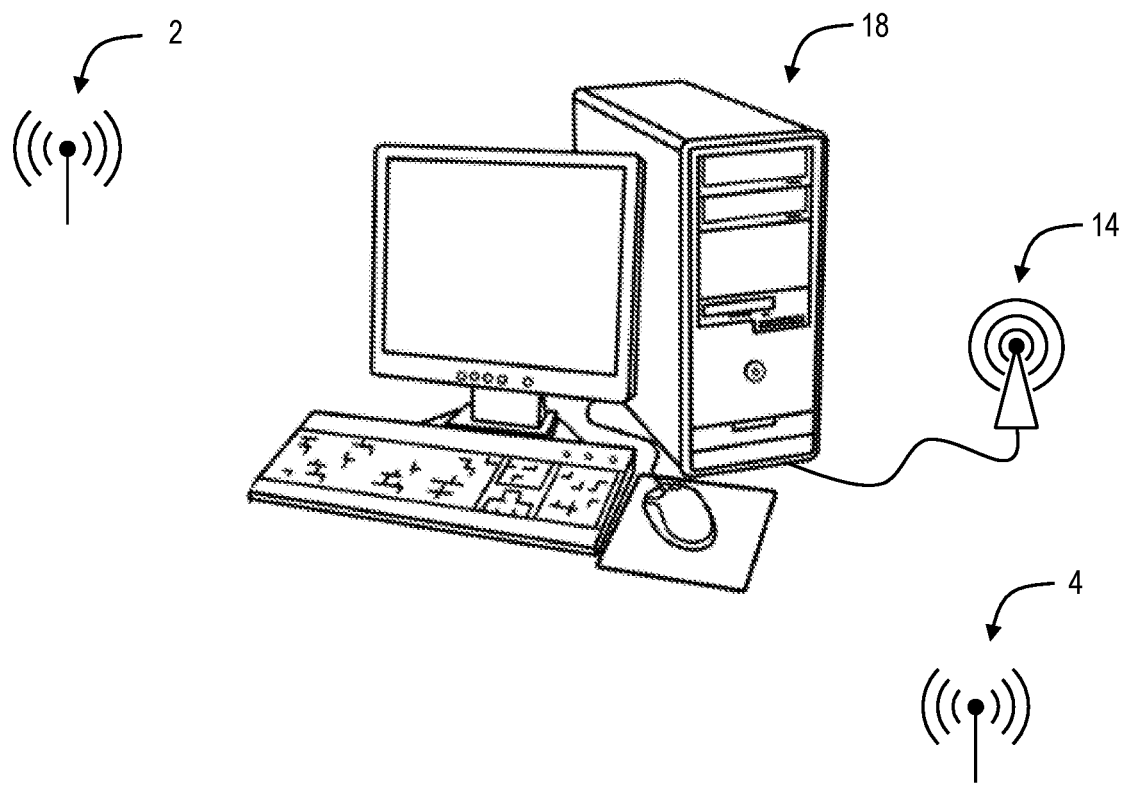

Referring to FIGS. 1A-1I, various mobile computing scenarios encounter connectivity challenges related to the notion that a computing system and associated transceiver are being moved in and out of proximity of one or more wireless networking connectivity points. Referring to FIG. 1A, a typical mobile computing system (6) is depicted comprising a laptop computer (10) that is equipped with a single transceiver antenna designed to work with IEEE 802.11 type networks (such as 802.11A, 802.11B, 802.11G, 802.11N), also known as "Wi-Fi" networks, to connect with other computing systems. In a typical mobile computing scenario, the system (6) may be transported to various locations that are in between two or more Wi-Fi transceiver access points (2, 4), and conventionally, a Wi-Fi adaptor operatively coupled to, or comprising a portion of, the mobile computing system (6) may be utilized to connect with one of the access points (2, 4) at a time, generally through a manual selection configuration wherein the operator of the computing system selects an access point for connectivity. Referring to FIG. 1B, the computing system (6) may be operatively coupled to an external Wi-Fi transceiver (14) in the event that one is not integrated into the computing system. Referring to FIG. 1C, even relatively large computing systems, such as the depicted desktop computing system (18), may be mobilized between Wi-Fi access points (2, 4) using a cart, vehicle, or other transportation means that bring about a need for solving connectivity robustness challenges that are associated with the mobility relative to the positions of the Wi-Fi access points (2, 4).

Figure 1D:
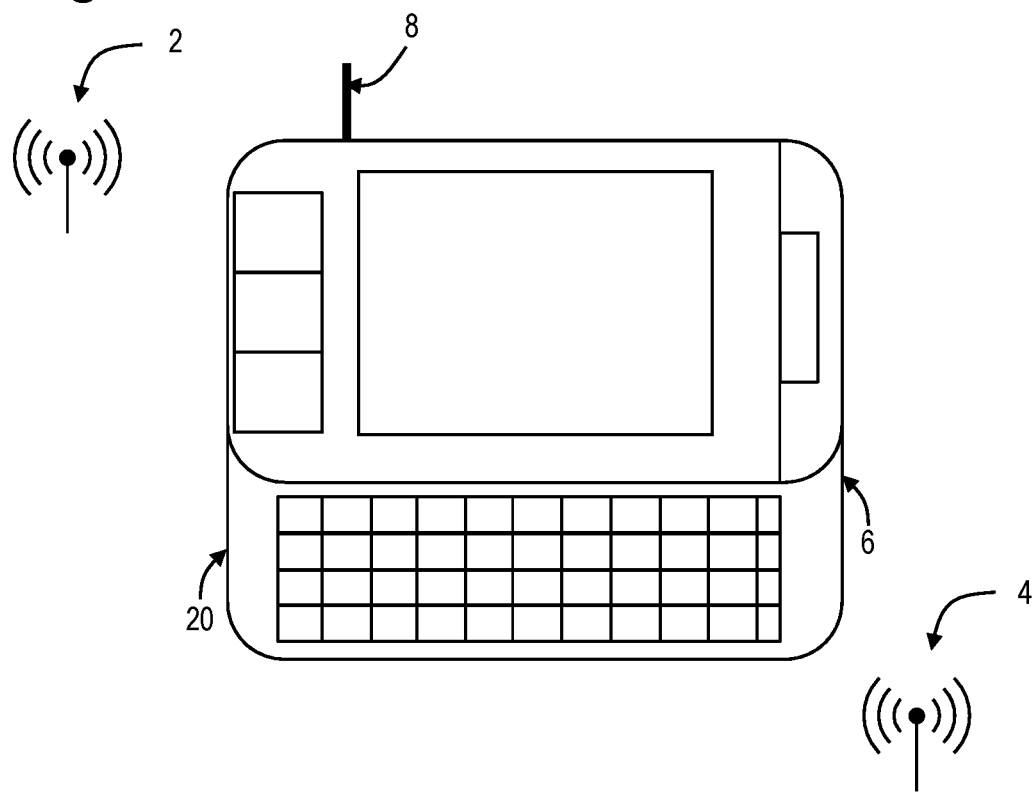
Figure 1E:
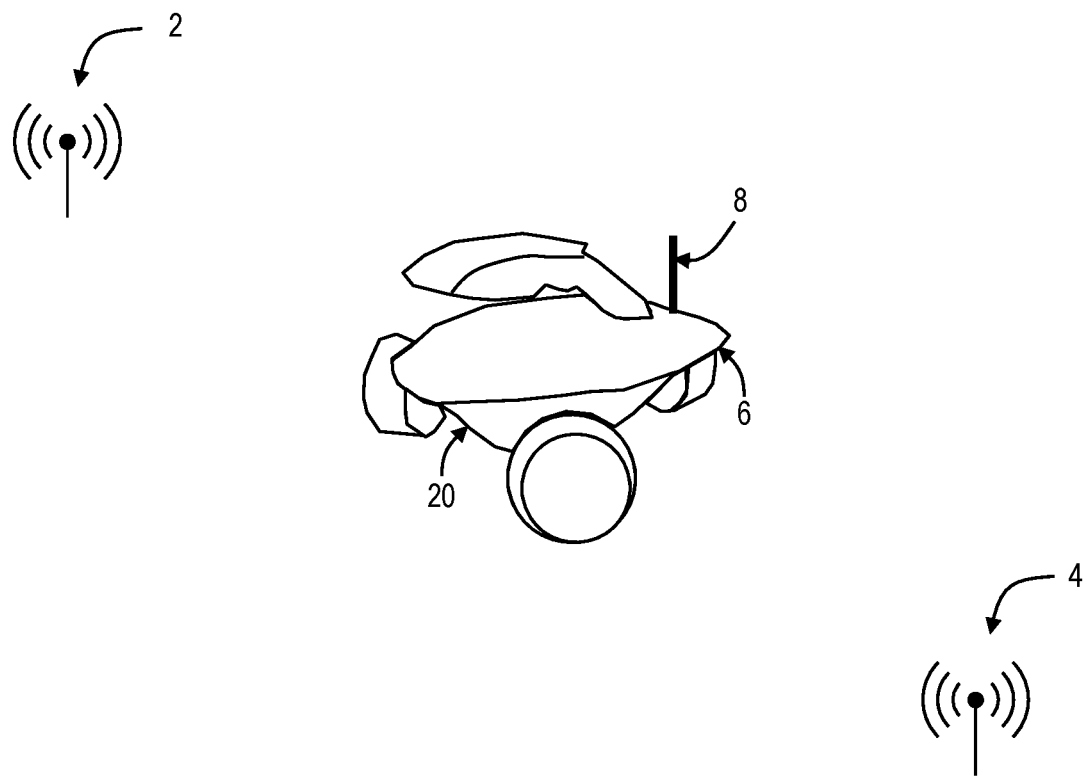
Figure 1F:
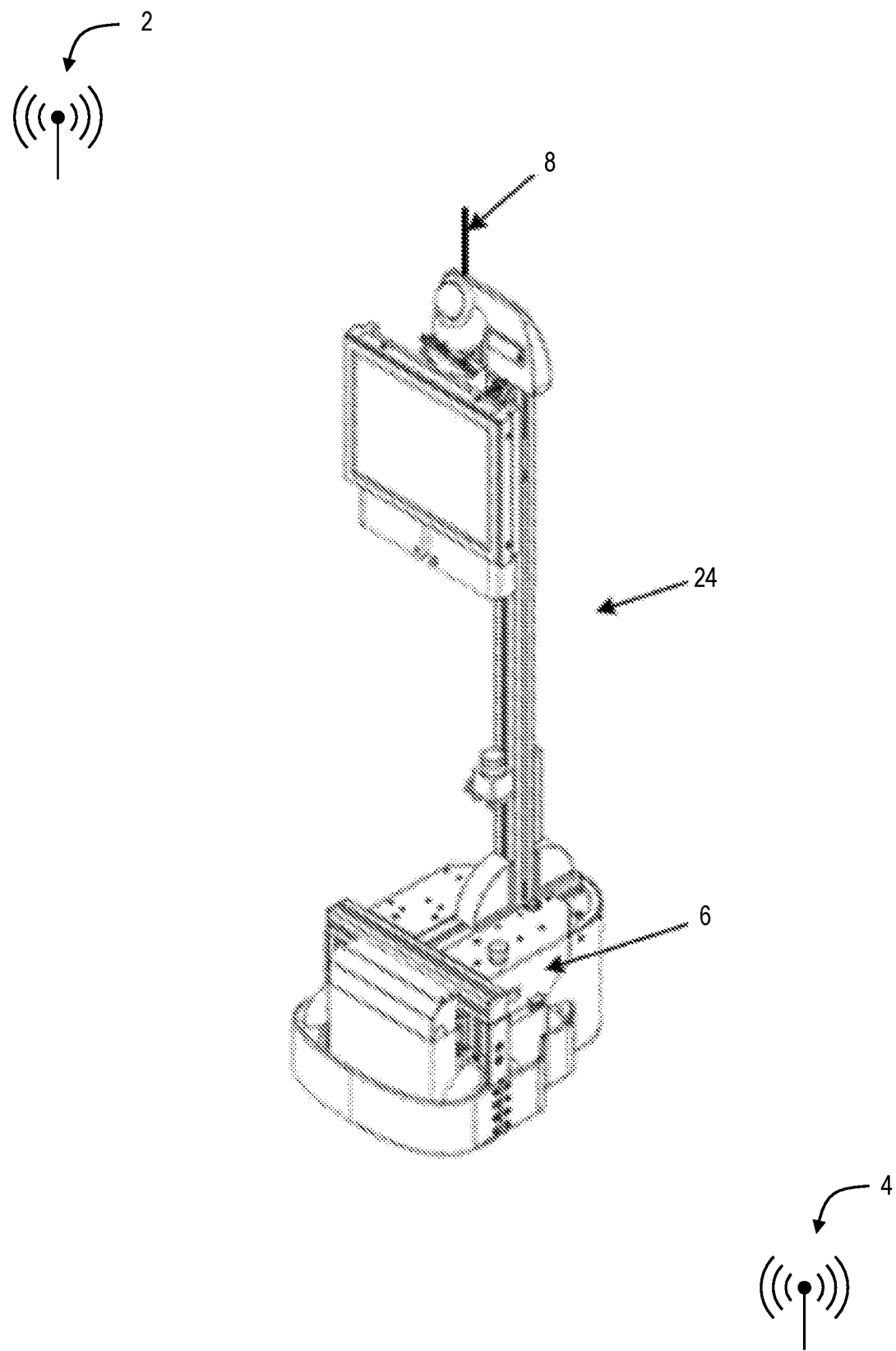

Referring to FIG. 1D, a handheld (20) mobile computing system (6), such as those distributed under the tradename iPod Touch® by Apple Computer of Cupertino, Calif., comprises a single Wi-Fi transceiver antenna (8) and is configured to be carried with the operator as the operator moves in an environment that may be within the range of two or more Wi-Fi access points (2, 4). Referring to FIGS. 1E and 1F, the connectivity and mobility challenge may be associated with a device that is self-propelled. Referring to FIG. 1E, an electromechanically mobile toy robot (22) comprises a computing system or microcontroller (6) and a transceiver antenna (8). As the toy robot (22) is navigated using instructions from a remote master input device (such as a joystick that may be connected to a computer local to the operator), an integrated camera and other devices may be utilized to capture images and send them through a wireless network, such as a Wi-Fi network facilitated by one or more access points (2, 4), to a computer that may be observed by the operator during the robot navigation. Referring to FIG. 1F, an electromechanically mobile remote presence system (24), such as those available from Vgo Communications, Inc. of Nashua, N.H., InTouch Health, Inc. of Santa Barbara, Calif., or Suitable Technologies, Inc. of Palo Alto, Calif., is depicted, generally comprising a computing system or microcontroller (6) and a transceiver antenna (8) mounted upon a mobile base capable of electromechanically navigating floors and other surfaces subject to commands from a remote operator connecting to the mobile computing system (6) through some kind of wireless network, such as a Wi-Fi network that may be facilitated by one or more wireless access points (2, 4) positioned in the vicinity of the mobilized system (24). Typically control commands, such as affirmative driving or navigation commands, or attempts to communicate with others, such as transmitted sound and/or video, are directed from a computer local to the operator, through a wireless network, to the mobile remote presence system (24), and captured video or photo images, sound, and other information are directed from the mobile system (24) back to the computer local to the remote operator through the same wireless network.

Referring to FIGS. 1G, 1H, and 1I, a mobile computing system (6), in these cases comprising a mobile handset (20), may be rapidly moved through the transmission ranges of various network access points, such as Wi-Fi access points (2, 4), with various types of mobility configurations. For example, a person may carry a system (6, 20) with them as they walk around an office environment or out on a sidewalk, they may carry the system (6, 20) with them as they (26) ride a bicycle (28), or they may carry the system (6, 20) with them as they mobilize within a faster vehicle, such as a car (30) or even an airplane (32). With any of the connectivity mobility challenges presented in FIGS. 1A-1I, there is a need for systems and methods configured to automatically assist with seeking out, testing, utilizing, and upgrading wireless connectivity in real or near-real time at a frequency high enough to make the overall connectivity scenario relatively robust.

Figure 2A:
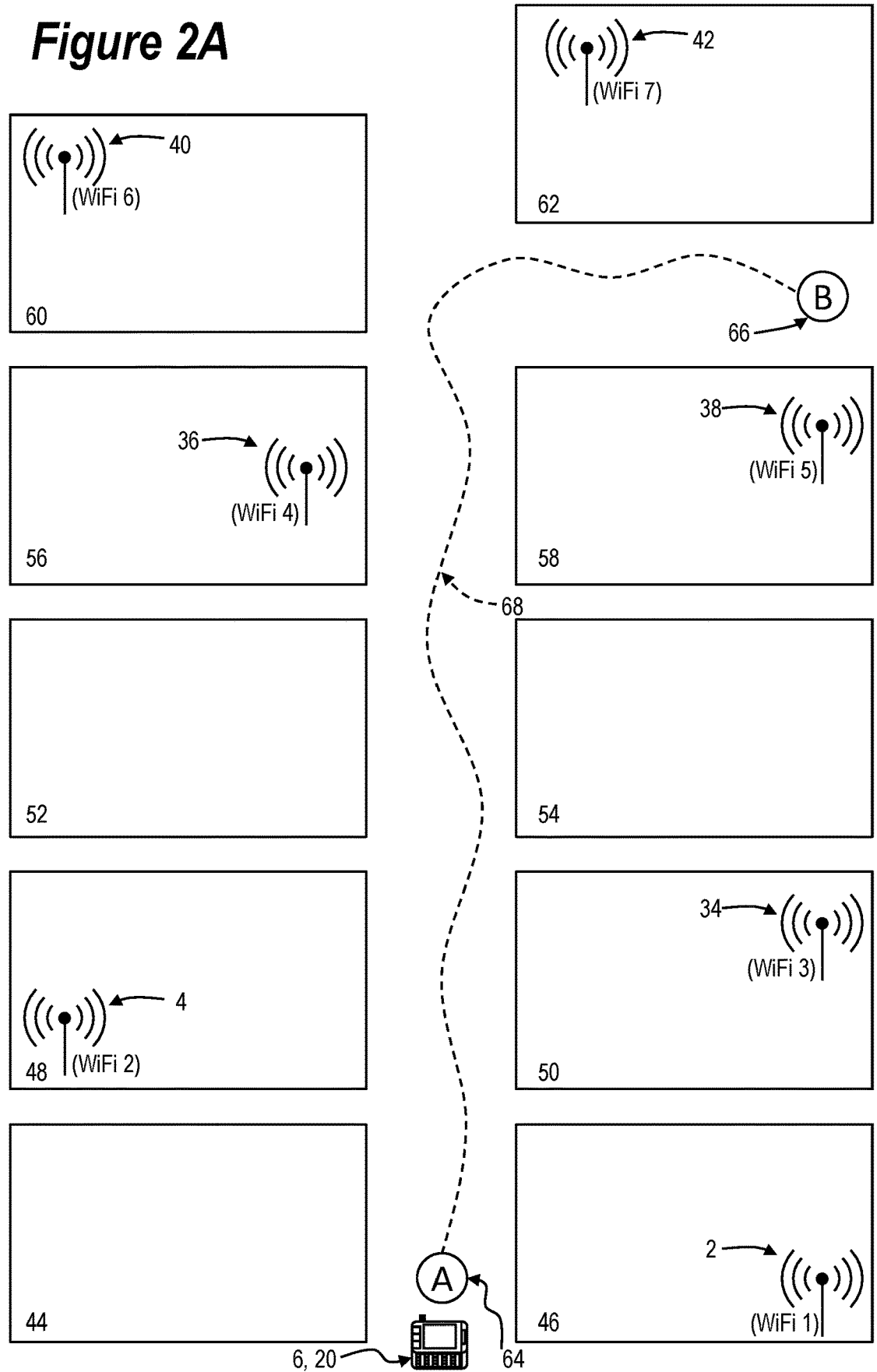

Referring to FIGS. 2A-2E, in one embodiment, a parallel connectivity and switching scheme may be utilized to address the wireless connectivity robustness challenge. Referring to FIG. 2A, a mobile computing system comprising a handheld device (6, 20) is located at a first location designated as point "A" (64) This location (64) is surrounded by a plurality of Wi-Fi access points (2, 4, 34, 36, 38, 40, 42) that are distributed amongst a plurality of physical structures (44, 46, 48, 50, 52, 54, 56, 58, 60), that may be, for example, representative of cubicle dividers in an indoor work environment, walls within an indoor work environment, city blocks within a town, or other configurations. In the present illustrative example, they shall be considered walls within an indoor work environment. At the first location (64), the system (6, 20) appears to be closest to the Wi-Fi access points in rooms 46, 48, and 50 (2, 4, and 34, respectively). In one embodiment, the system (6, 20) comprises a Wi-Fi adaptor that is configured to be able to connect with one channel while continuing to scan on another channel in the background. In such embodiment, absent an initial connection, the system (6, 20) preferably is configured such that the computing system (6) or controller will operate the Wi-Fi adaptor to scan to find available Wi-Fi access points. In the scenario depicted in FIG. 2A, let's assume that the scanning exercise finds only the Wi-Fi access points in rooms 46, 48, and 50 (2, 4, and 34, respectively). In this embodiment, the controller will be configured to attempt to connect to the internet through each of the available connected servers, and evaluate each of the connections. In other words, whenever it does connect to a server, it will try to send data to the server, and if successful in sending data, will rate the connectivity based upon one or more factors, such as lowest latency, lowest packet loss, least expensive (in the event of a fee for service paradigm), etc. Given an opportunity to choose between two available sources of connectivity, the system is configured to route all traffic through the best (i.e., most highly rated in view of the rating factors) connection, which may be transiently deemed the "primary" connection. With the primary connection established and data flowing through the primary, the system generally will be configured to not disturb the primary connection, but to scan very aggressively with the other remaining channel (transiently the "secondary" channel of the Wi-Fi adaptor) to find other access points and other associated connectivity that may rank above or near the connectivity ranking of the current primary connection, the notion being that the primary/secondary roles are transient, and if the secondary starts to look better than the primary, the system will automatically reverse the roles. In the above described embodiment wherein one Wi-Fi adaptor is utilized to allow scanning of two channels, it may be somewhat difficult to leave the primary channel undisturbed, as the transceiver needs to be also utilized (i.e., via multiplexing, etc.) for the secondary channel.

The switching of primary and secondary connection roles may be accomplished by the system almost instantly by switching the packet stream so that an outside connectivity gateway associated with a remote server or computer to which the mobile system (6) is being connected will be electronically notified that the packets that used to be coming from one adaptor channel are now coming from another adaptor channel, so the remote server or computer should now stream the reply packets to the new location. Indeed, the world of external computing systems to which the mobile system (6) will be connected are well-suited for this kind of switching configuration. Cryptographic hash techniques or other security features may be utilized to prevent any other computing systems from breaking into the communication established between the mobile computing system (6) and the targeted remote server.

Another important feature of this embodiment is a frequency scanning paradigm wherein not all frequencies are scanned with each bout of scanning from the secondary channel (or in the case of an adaptor that has no initial connectivity, both or all available channels which may be scanning simultaneously to establish a primary connection). For example, in a conventional scenario, such as one involving the Linux Network Manager Wi-Fi adaptor control configuration, the Wi-Fi adaptor will do a scan of the whole 802.11 A or 802.11 B band, which can take 5 or 10 seconds, after which it will select an access point and try to connect. If that initial attempt fails, the controller will reschedule another scan 5 seconds in the future. Then it will do another scan, select another access point, and try to connect again. If that second attempt fails, the operator of the computer is sitting waiting for a connection for at least 30 seconds. The inventive system is much more aggressive. For example, in one embodiment, the controller generally is configured to operate the Wi-Fi adaptor channels to not do full scans of all available frequencies; rather, it is configured to scan just a few selected frequencies on a "hot" list in a staggered fashion, such that a new batch of scans comes in every few milliseconds from one or more particular frequencies, with new data for the entire hot list returning every few seconds—such as on a cycle of about 3 seconds. With the new data, the controller may be configured to immediately start making decisions about whether to connect or not. So in such an embodiment, scan time is minimized quite a lot relative to conventional paradigms. Further, a "fail fast" logic paradigm dictates that after a decision to try to connect is made, a connection attempt is made very rapidly, after which connectivity success or failure is monitored for a brief time such as one second (or perhaps two seconds on an encrypted network); if there is no answer within two or three seconds, the connectivity is deemed a failure and the system moves on. Further, once the system (6) is connected to an outside server or computer, it needs an address for communications. This generally involves what is known as dynamic host configuration protocol, or "DHCP", and in the preferred embodiment, the system is quite aggressive with this also. In one embodiment, if a DHCP request is not answered within a couple of seconds, the system will try a second attempt; if the second attempt for an address is not successful very quickly, connectivity is deemed a failure. Generally, the system is configured to attempt to connect for at most two seconds, and will be trying to connect every few hundred milliseconds. Thus the theme of being very aggressive and having strict limits for timing out and moving on.

Referring again to the aforementioned "hot" list of frequencies and the notion of only scanning a select group of frequencies, in one embodiment the system is configured to categorize frequencies within a particular 802.11 Wi-Fi paradigm. For example, in an 802.11 B configuration, where there are 11 discrete wireless connection frequencies, the system may be configured to have a prioritization organization for this group of 11, such that each frequency is labeled as either "hot", "medium", or "cold" based upon factors such as strength of signal in a recent timeframe, time in as a primary connection frequency in the a recent timeframe, average latency over a given timeframe, average packet loss over a given timeframe, or cost over a given timeframe. In an scenario wherein 3 of the 11 802.11 B frequencies are on the "hot" list, the system may be configured to quickly and repetitively scan those three discrete frequencies only to establish primary and secondary connectivity, without resorting to the remaining 8 frequencies that only are categorized as "medium" or "cold". In one embodiment, upon failure to connect within a given period of time using one of the "hot" frequencies, the system may be configured to include the "medium" frequencies in the scanning routine, and perhaps even the "cold" frequencies to observe whether any of them appear to be improving and potentially moving from "cold" to "medium" or "hot"; similarly, scanning the "medium" frequencies may assist in updating the evaluation of such frequencies, and potentially reclassifying one or more of them as "hot" or "cold" given the updated information. In one embodiment, the "hot" frequencies may be scanned at relatively short intervals, say every 2 or 3 seconds, while "medium" frequencies may be scanned only every 5 seconds, and "cold" frequencies scanned only every 10 seconds. Such intervals may be tuned in accordance with the available hardware configurations. We have found that the inventive system is able to scan a frequency in as little as 100 milliseconds, so scanning all 11 of the 802.11 B frequencies can be conducted in as little as 1.1 seconds. Other network protocols, such as 802.11 A, have larger numbers of discrete frequencies (20, 30, or more), which may place even more value on employing a frequency/scanning prioritization schema as described above, so that the hardware may be utilized to scan at relatively high frequency the frequencies that are known to be "hot", and not waste as much time on the ones that are known to be "cold" or "medium".

Figure 2B:
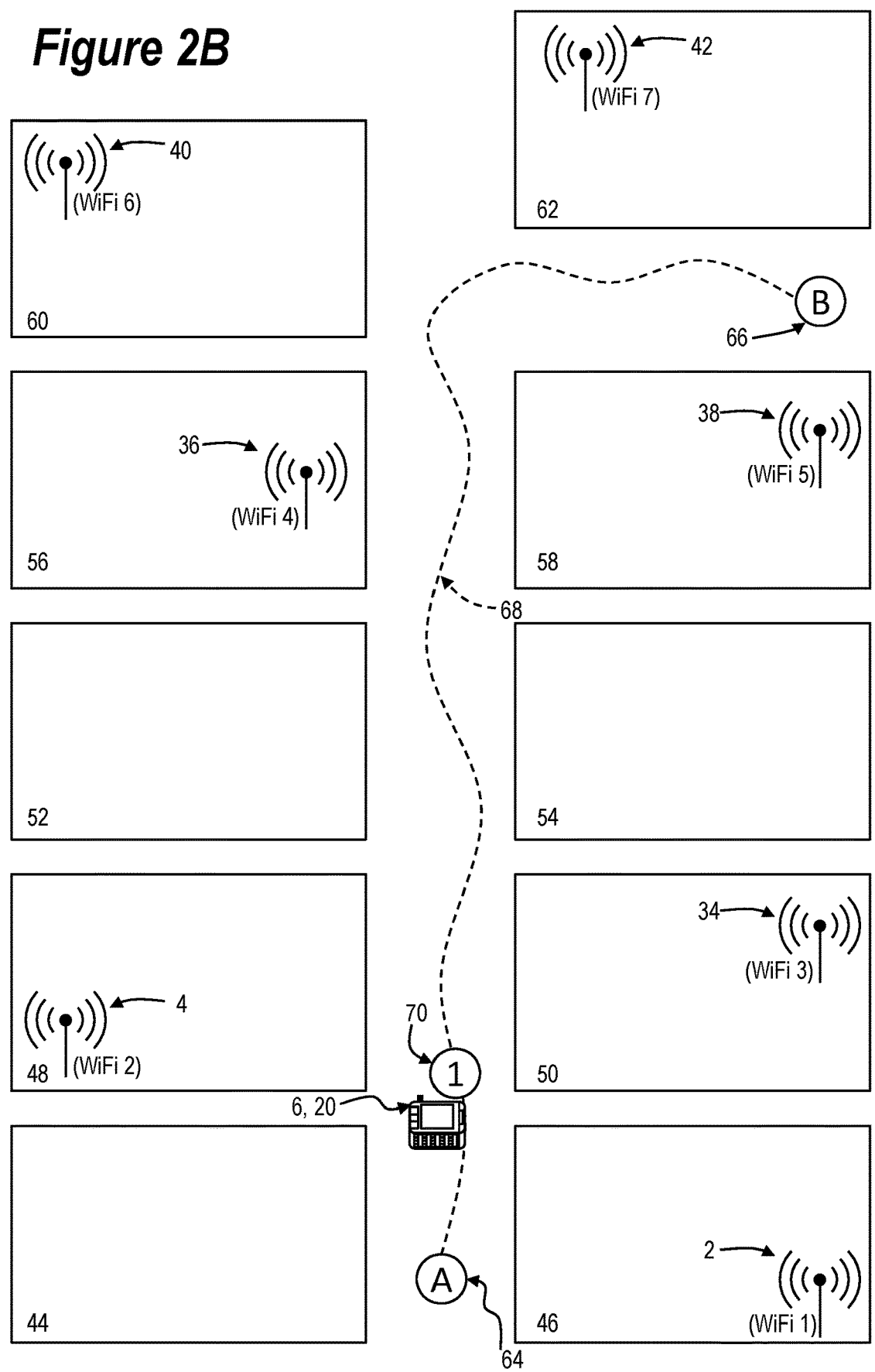
Figure 2C:
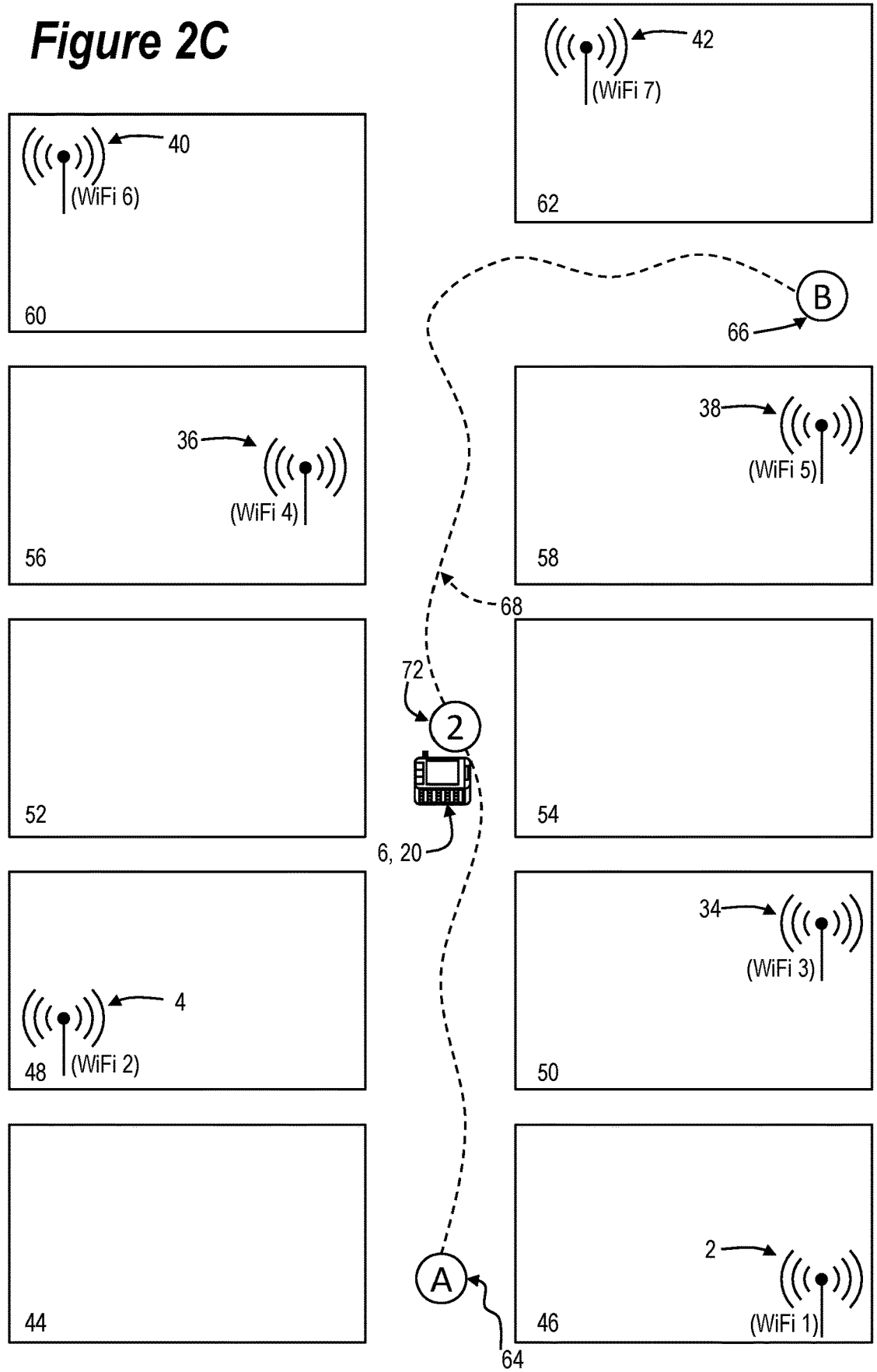
Figure 2E:
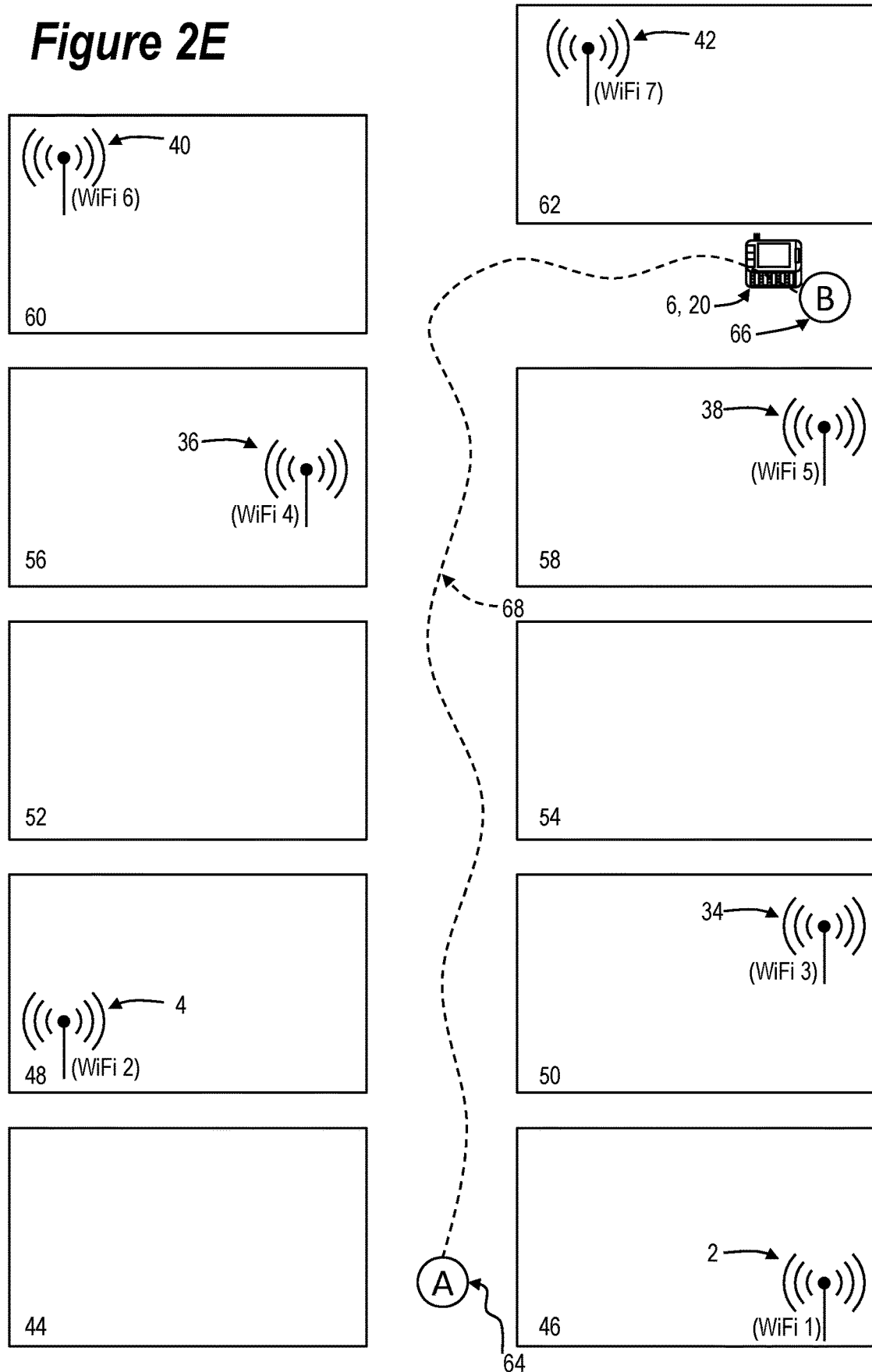

Referring to FIG. 2B, as the mobile system (6, 20) approaches point "1" (70) on the path (68) between point "A" (64) and point "B" (66), it may start to see signal from not only the first three Wi-Fi access points in rooms 46, 48, and 50 (2, 4, and 34, respectively), but also from two additional Wi-Fi access points in rooms 56 and 58 (36, 38, respectively). In a case wherein a primary connection has already been established (say to Wi-Fi access point 1 (2)), the mobile wireless adaptor may be scanning in the background to analyze all of the remaining available connections through the other Wi-Fi access points (4, 34, 36, 38), or may utilize a "hot/medium/cold" or similar paradigm to mitigate the number of scans by focusing initially only upon the "hot" frequencies (which may be associated with any of the four other Wi-Fi access points 4, 34, 36, 38), for example, as described above. Similarly, referring to FIG. 2C, as the mobile system (6, 20) approaches point "2" (72) on the path (68) between point "A" (64) and point "B" (66), it may start to see signal from not only the first five Wi-Fi access points in rooms 46, 48, 50, 56, 58 (2, 4, 34, 36, and 38, respectively), but also from two additional Wi-Fi access points in rooms 60 and 62 (40, 42, respectively). As the system (6, 20) continues to move along the path (68), it will continue to analyze potential secondary connections, and possibly switch primary/secondary connection roles as described above. Further, a "hot/medium/cold" or similar paradigm may be utilized to mitigate the number of scans by focusing initially only upon the "hot" frequencies (which at point "2" (72) may, for example, be associated with any of the seven access points that can be detected), for example, as described above. Referring to FIGS. 2D and 2E, as the mobile computing system continues to move through the environment along the path (68) to point "3" (74) and ultimately point "B" (66), a similar persistent testing/analysis and possible primary/secondary connection role switching may be conducted to maintain a robust connectivity schema between the mobile system (6, 20) and one or more computers or servers to which the mobile system (6, 20) is trying to remain connected, through the internet.

Referring to FIG. 3, a flowchart illustrates one embodiment wherein a controller is operatively coupled to a Wi-Fi adaptor that is configured for background scanning on a second channel while being connected using a first channel (76), as described above in reference to FIGS. 2A-2E. Initially the controller may be configured to operate the Wi-Fi adaptor to scan and find Wi-Fi access points (78). Upon connection to a first Wi-Fi access point with the first channel of the Wi-Fi adaptor, the controller may be configured to try to send data to a first remote server or computer that is operatively coupled to the Wi-Fi access point (80). Upon success in sending data to the first remote server, the controller may be configured to evaluate the connectivity based upon one or more predetermined factors (such as latency, packet loss, financial expense of the particular connection, etc.) (84). Simultaneously, the second channel may be utilized to connect to a Wi-Fi access point using background scanning with the Wi-Fi adaptor, and the controller may be configured to send data to a remote server operatively coupled to the Wi-Fi access point (82). With success in sending data to the second remote server, the controller may be configured to evaluate the connectivity based upon one or more predetermined factors (such as latency, packet loss, financial expense of the particular connection, etc.) (86). The controller may be configured to select the connection configuration with the best connectivity evaluation results, and the winner may be established as a primary connection using the Wi-Fi adaptor (88), while the non-selected channel may be utilized to continue scanning and evaluating other connection opportunities which may become secondary connections (90). The controller may be configured to persistently evaluate whatever connection is transiently the second connection relative whatever connection is transiently the primary connection, with the best connection becoming the new primary connection (92), and the non-selected channel continuing to scan to find and establish alternative secondary connections which may become primary connections themselves (94).

Figure 4A:
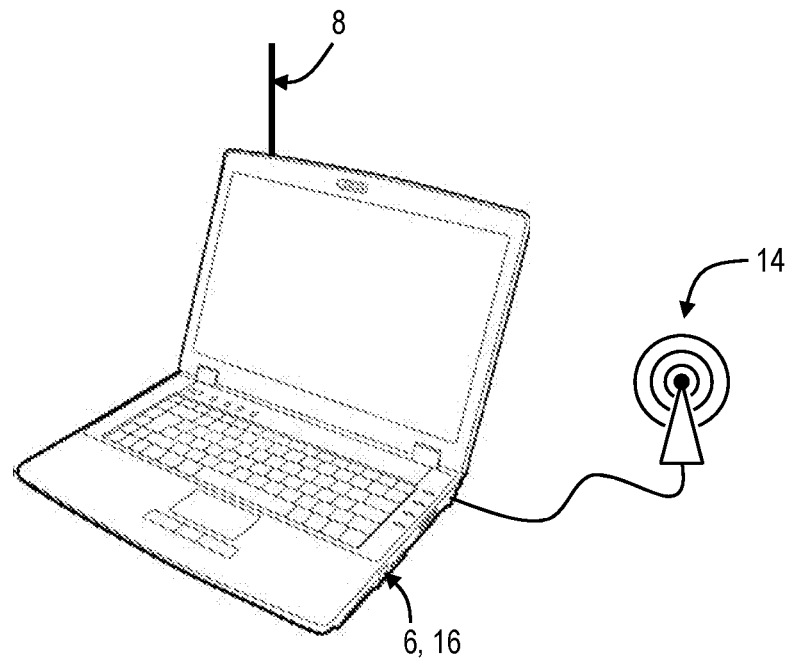
FIGS. 4A-4D depict embodiments of computing systems which may be connected to the internet or other computing systems using two or more wireless transceivers.
Figure 4B:
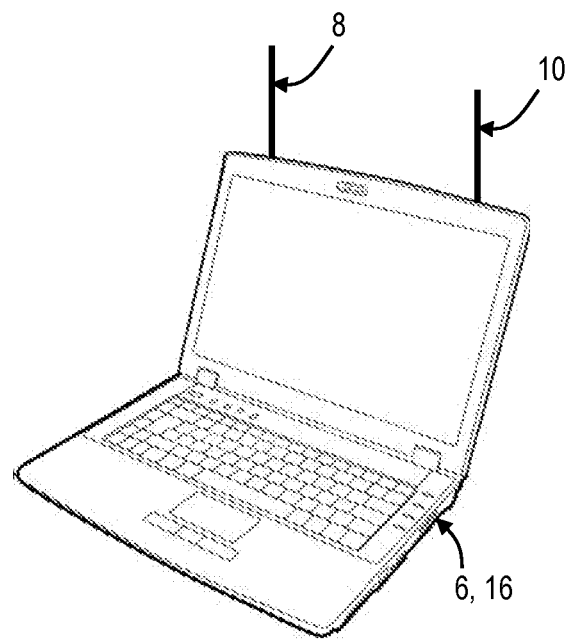
Figure 4C:
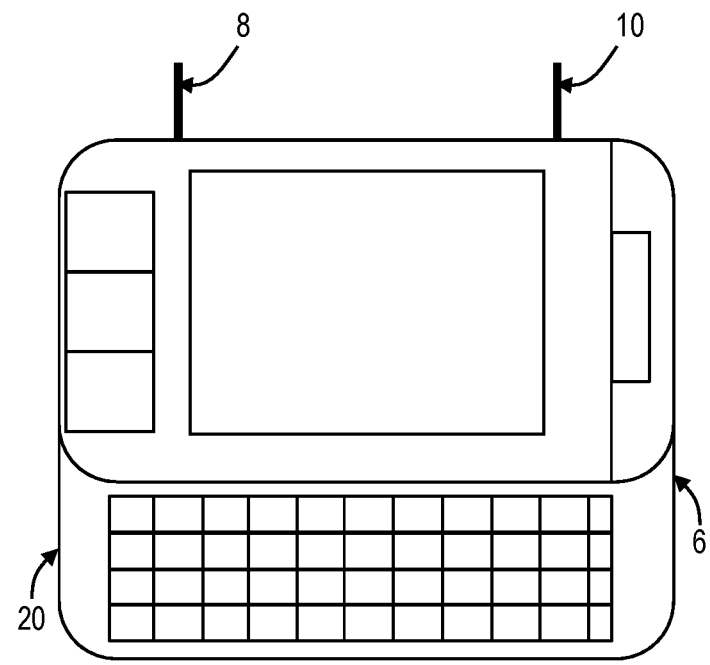
Figure 4D:
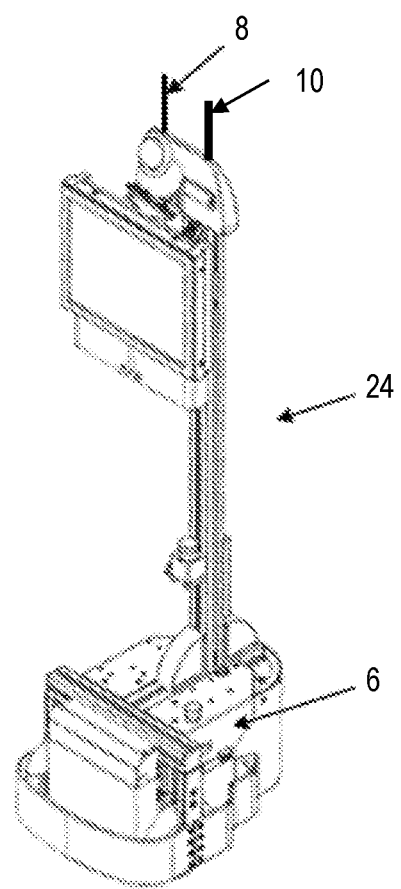

Mobile computing systems may be equipped with more than one antenna or transceiver, and more than one networking capability. For illustrative purposes, a few embodiments are shown in FIGS. 4A-4D. For example, referring to FIG. 4A, a mobile computing system (6) in the form of a laptop computer (16) is shown having two Wi-Fi transceivers—one integrated into the laptop (8), and the other (14) external but operatively coupled. FIG. 4B shows a similar embodiment with two internal Wi-Fi transceivers (8, 10) FIG. 4C depicts a handheld (20) computing system (6) with two integrated Wi-Fi transceivers (8, 10). Finally, FIG. 4D depicts a mobile telecommunications robot (24) having two intercoupled Wi-Fi transceivers (8, 10); such an electromechanically mobile system (24) may comprise a remotely-operable electromechanically navigable telecommunications and remote presence platform, such as those available from Anybots, Inc. of Mountain View, Calif.

Having two independent Wi-Fi adaptors provides the opportunity for configuring the controller to run them in parallel, simultaneously, to conduct connection robustness improvement techniques similar to those described in reference to FIGS. 2A-3. For example, referring to FIG. 5, a controller is operatively coupled to two or more Wi-Fi adaptors and configured to operate them independently (98). The controller may operate the Wi-Fi adaptors to scan to find available Wi-Fi access points providing connectivity to the internet and/or other remote computing systems (100). Upon connection to a Wi-Fi access point with the first Wi-Fi adaptor, the controller may be configured to try to send data to a remote server operatively coupled with the Wi-Fi access point (102). Upon success in sending data to the remote server, the controller may be configured to evaluate the connectivity based upon one or more factors, such as latency, packet loss, financial expense of the particular connection, etc. (106) Simultaneously, the second Wi-Fi adaptor may be utilized to connect to a Wi-Fi access point and the controller may be configured to attempt to send data to a remote server operatively coupled to the Wi-Fi access point (104). Upon success in sending data to the remote server, the controller may be configured to evaluate the connectivity based upon one or more factors, such as latency, packet loss, financial expense of the particular connection, etc. (108).

The controller preferably is configured to select the connection configuration with the best connectivity evaluation results and connect to establish a primary connection (110). The Wi-Fi adaptor not chosen to carry the primary connection may be utilized to continue to scan for Wi-Fi access points, connect to them, send data to them, and evaluate connectivity until a secondary connection can be formed (112). The controller may be further configured to evaluate the secondary connection in view of the primary connection, and to select the connection configuration with the best evaluation results to be the new primary connection (114), which may involve a role reversal for primary/secondary connections and associated Wi-Fi adaptors. The Wi-Fi adaptor not chosen as the primary connection holder may then be utilized to scan for Wi-Fi access points, connect to them, send data, and evaluate connectivity until a new secondary connection may be formed (116).

Figure 6A:
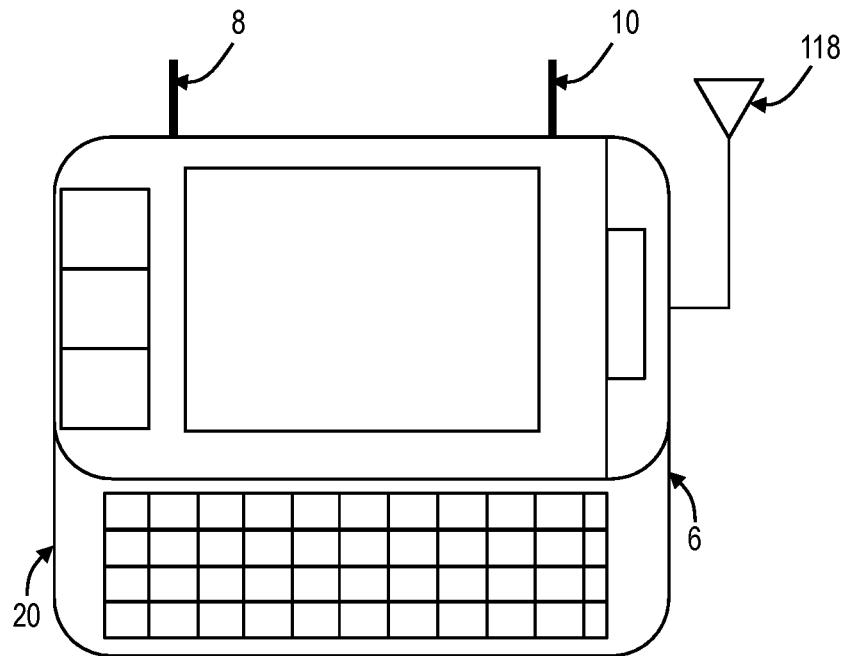
FIGS. 6A and 6B depict mobile computing system variations with two Wi-Fi adaptors as well as a cellular wireless adaptor.
Figure 6B:
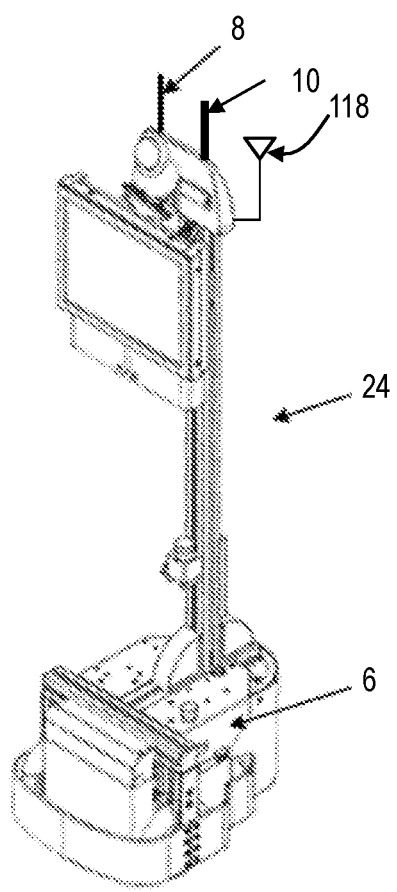
Figure 7A:
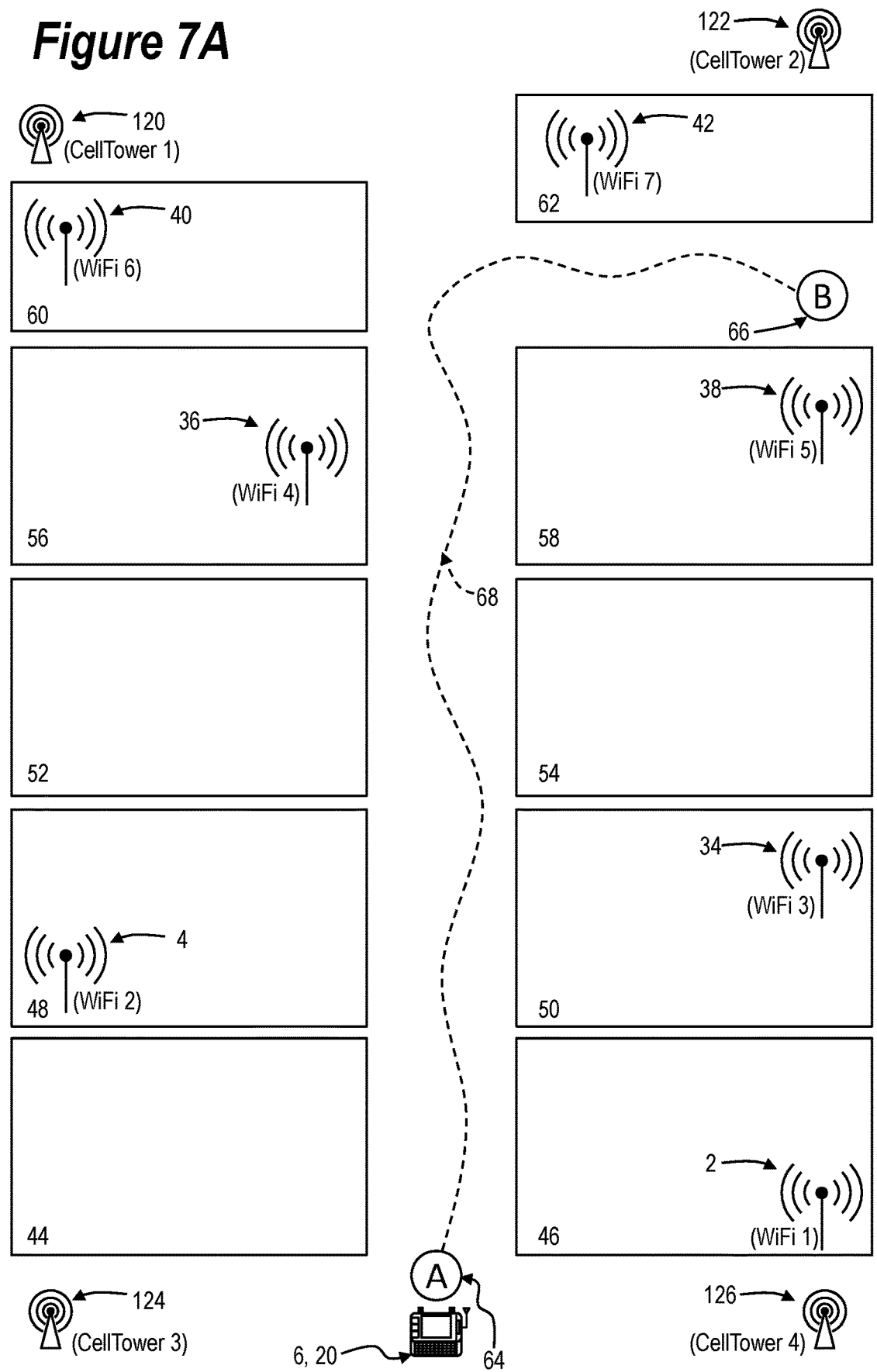
Figure 7B:
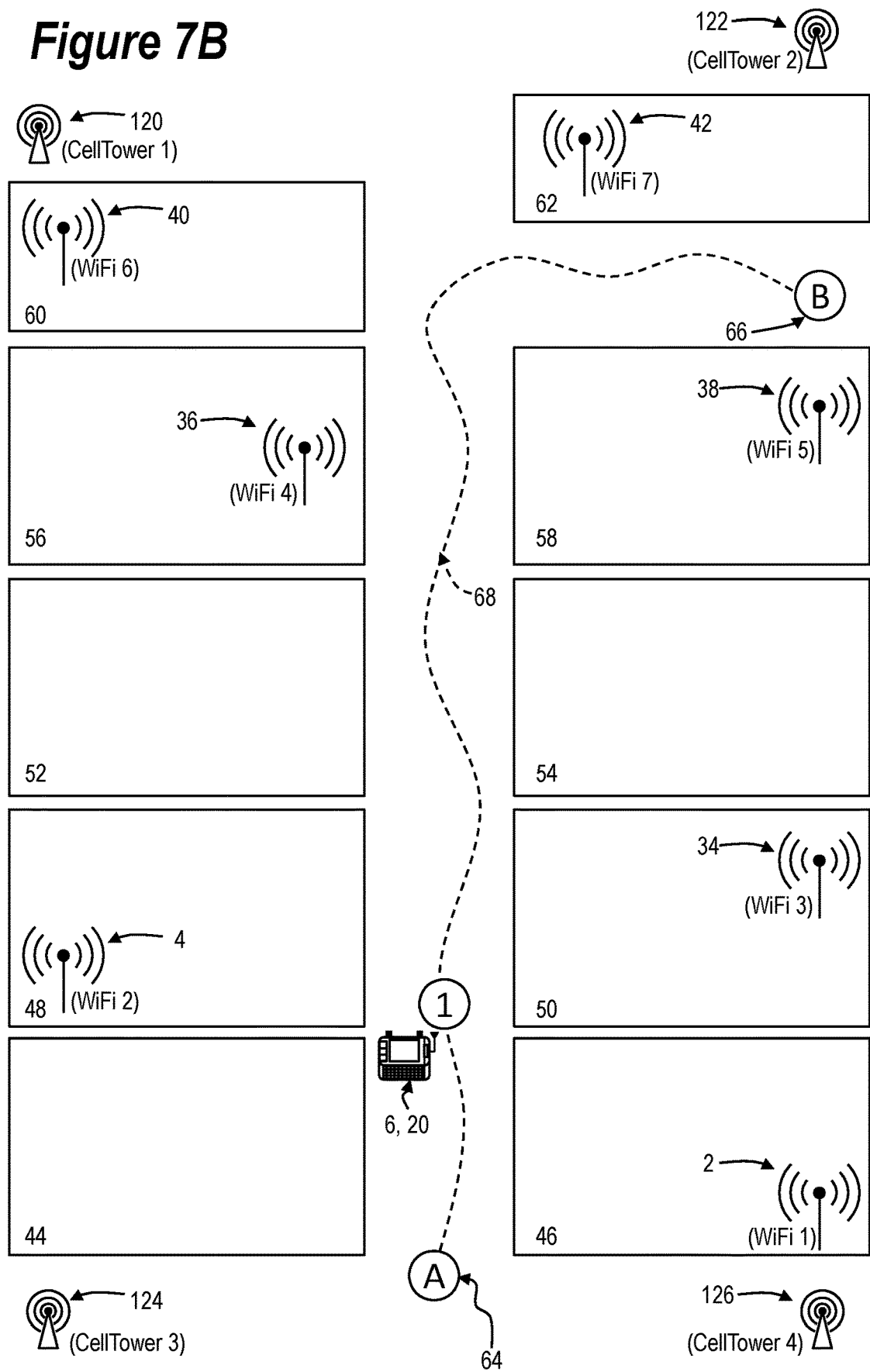
Figure 7D:
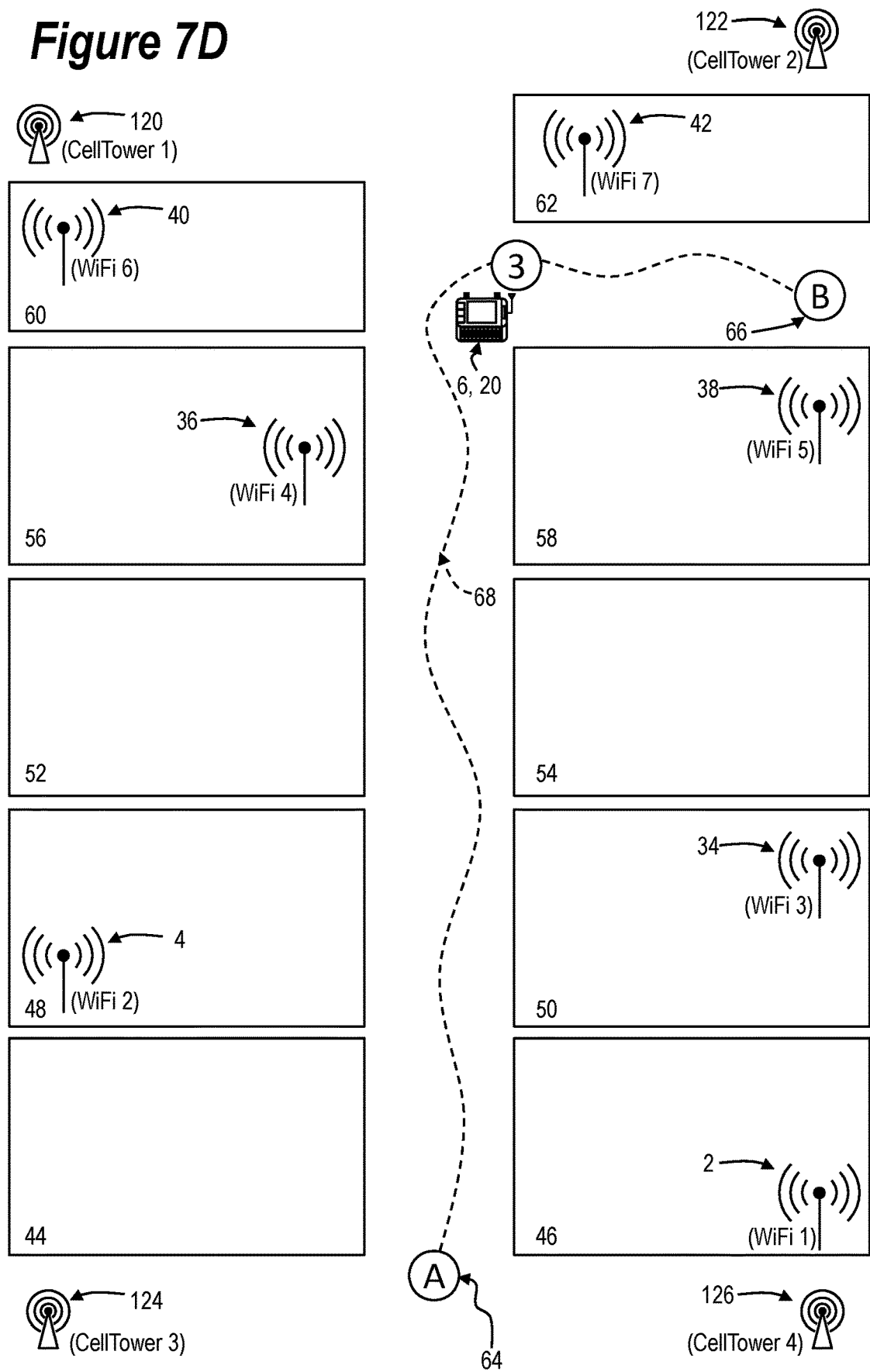

Referring to FIGS. 6A and 6B, in addition to two or more Wi-Fi type transceivers (8, 10), a mobile computing system (6), such as a handheld device (20) or a mobile telecommunications robot (24) may be operatively coupled to a cellular mobile transceiver (118), such as one configured to operate with a TDMA network, CDMA network, PDMA network, GSM network, 3G network, 4G network, or the like. Such networks are conventionally utilized for cellular telephone, but are being utilized for smartphone and cellmodem connectivity as well. With the added element of one or more cellular mobile connectivity points, a mobile computing system may be afforded additional connectivity robustness. For example, referring to FIGS. 7A-7E, a handheld mobile computing system (6, 20) is shown navigating a similar path as described in reference to FIGS. 2A-2E, with the addition of a cellular mobile transceiver (118) operatively coupled to the mobile computing system (6, 20), as shown in the embodiment of FIG. 6A or 6B, and four cellular communication transceiver towers (120, 122, 124, 126) dispersed about the region through which the mobile computing system (6, 20), is navigated. Referring to FIGS. 7A-7E, as the mobile computing system (6, 20) navigates from point "A" (64), to point "1" (70), to point "2" (72), to point "3" (74), to point "B" (66), the controller preferably is configured to consider not only the existence and quality of available Wi-Fi-based connectivity through the nearby Wi-Fi access points and intercoupled Wi-Fi adaptor systems, but also the quality and existence of available cellular mobile based connectivity through the nearby cellular communication transceiver towers and intercoupled cellular mobile transceiver (118) configuration.

Figure 8:
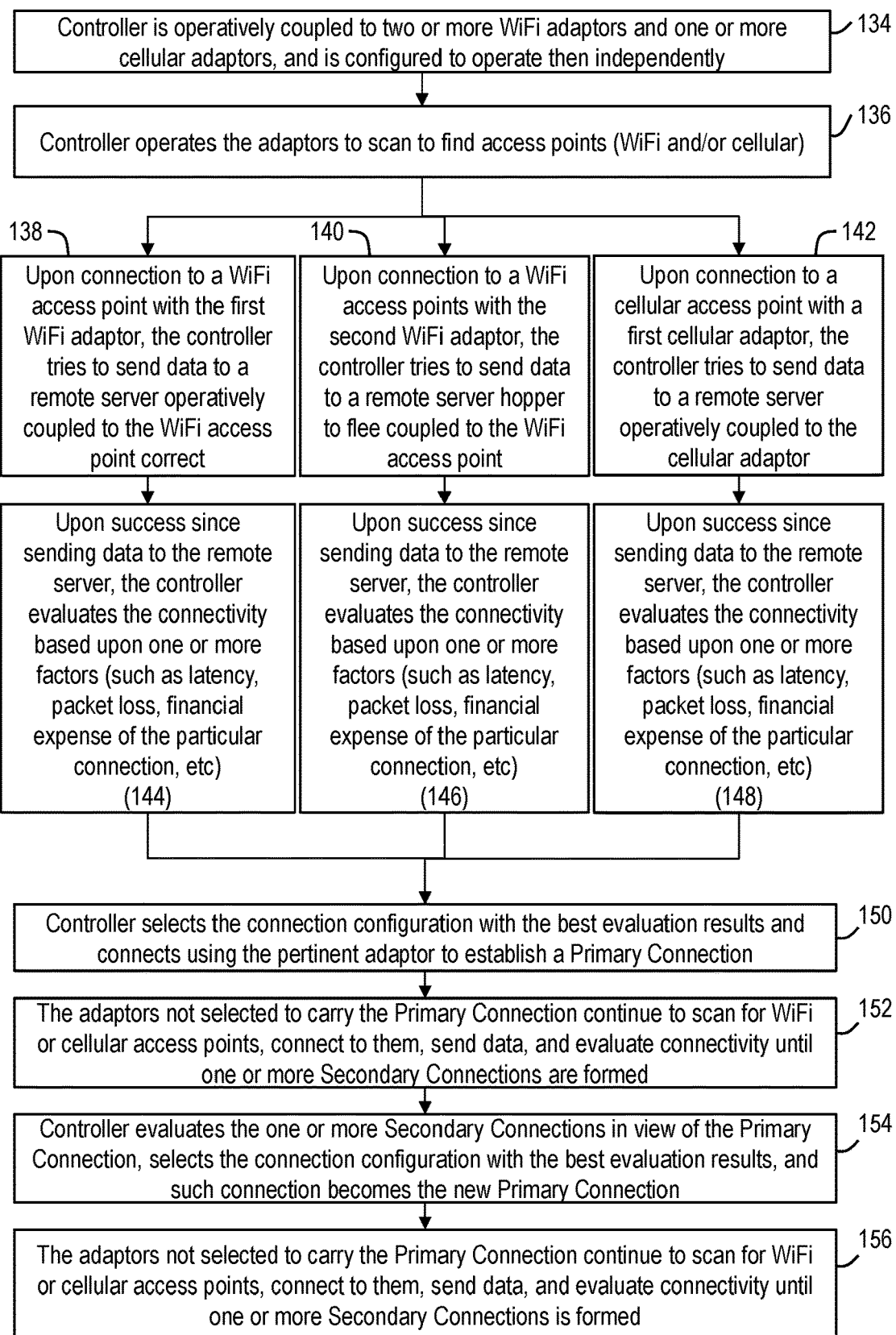
FIG. 8 depicts one embodiment of the invention wherein a combination of Wi-Fi connectivity and cellular connectivity may be utilized to improve connectivity robustness and quality for a mobile computing system.

One example of an embodiment combining Wi-Fi and cellular mobile connectivities leveraged together to improve mobile computing connectivity robustness is shown in FIG. 8. Referring to FIG. 8, one embodiment is illustrated wherein a controller is operatively coupled to two or more Wi-Fi adaptors and one or more cellular mobile adaptors, and configured to operate all of them independently and/or simultaneously (134) The controller is configured to operate the Wi-Fi and cellular mobile adaptors to find available access points (i.e., Wi-Fi access points or cellular transmission towers or transceivers) (136). Absent a preexisting primary connection, each available adaptor may be utilized to search for a connection which may become the primary connection. Upon connection to a Wi-Fi access point with the first Wi-Fi adaptor, the controller may be configured to attempt to send data to a remote server operatively coupled to the Wi-Fi access point (138). Upon success in sending data to the remote server, the controller may be configured to evaluate the connectivity based upon one or more factors, such as latency, packet loss, financial expense of the particular connection, etc. (144). Upon connection to a Wi-Fi access point with the second Wi-Fi adaptor, the controller may be configured to attempt to send data to a remote server operatively coupled to the Wi-Fi access point (140). Upon success in sending data to the remote server, the controller may be configured to evaluate the connectivity based upon one or more factors, such as latency, packet loss, financial expense of the particular connection, etc. (146). Upon connection to a Wi-Fi access point with the cellular mobile adaptor, the controller may be configured to attempt to send data to a remote server operatively coupled to the cellular mobile adaptor (142). Upon success in sending data to the remote server, the controller may be configured to evaluate the connectivity based upon one or more factors, such as latency, packet loss, financial expense of the particular connection (such as cellular mobile connectivity fees), etc. (148). The controller preferably is configured to select the connection configuration with the best evaluation results and connect using the pertinent adaptor to establish a primary connection (150). The adaptors not selected to carry the primary connection preferably are commanded by the controller to continue to scan for Wi-Fi or cellular mobile access points, connect to such points, send data, and evaluate connectivity until one or more secondary connections are formed (152). The controller preferably is configured to evaluate the one or more secondary connections in view of the primary connection, and select the connection configuration with the best evaluation results to become the new primary connection (154). The adaptors not selected to carry the primary connection may be commanded by the controller to continue to scan for Wi-Fi or cellular mobile access points, connect to these points, send data, and evaluate connectivity until one or more secondary connection options is developed (156), and such a cycle may be repeated as the primary connection is constantly and persistently upgraded while the mobile computing system is moved about.

Figure 9:
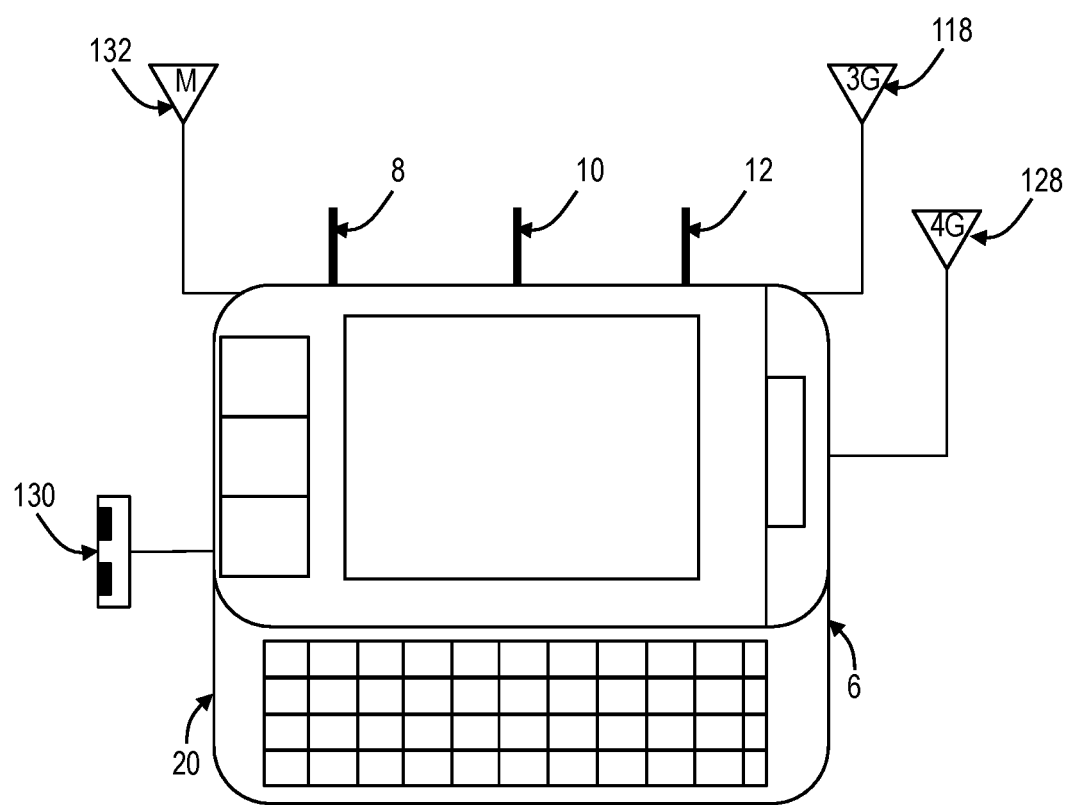
FIG. 9 depicts one embodiment of a mobile computing system having various multi-modal wireless communications capabilities that may be utilized to improve connectivity robustness and quality for a mobile computing system.

Referring to FIG. 9, many combinations and permutations of connectivity hardware and software may be utilized within the scope of this invention to provide improved connectivity robustness for mobile computing systems. For illustrative purposes, FIG. 9 depicts a handheld (20) mobile computing system (6) comprising three Wi-Fi-compatible wireless transceivers (8, 10, 12), an 802.16 WiMax,® (WiMAX Forum, Clackamas, Oreg.), wireless transceiver (132), a freespace optical wireless transceiver (130), and two cellular mobile transceivers—one for 3G networks (118) and one for 4G networks (128), each of which may be operated simultaneously to provide connectivity options which may be evaluated by the controller and selected transiently as a primary connection, while the other adaptors continue to persistently search for other secondary connection options, any one of which may become the next primary connection, as described above.

Referring to FIGS. 10-21, various embodiments and configurations are illustrated for optimizing communications between a mobile controller, such as a mobile remote presence system (24), as shown in FIG. 6B, for example, and a remotely-placed controller, such as a remote server.

Figure 10:
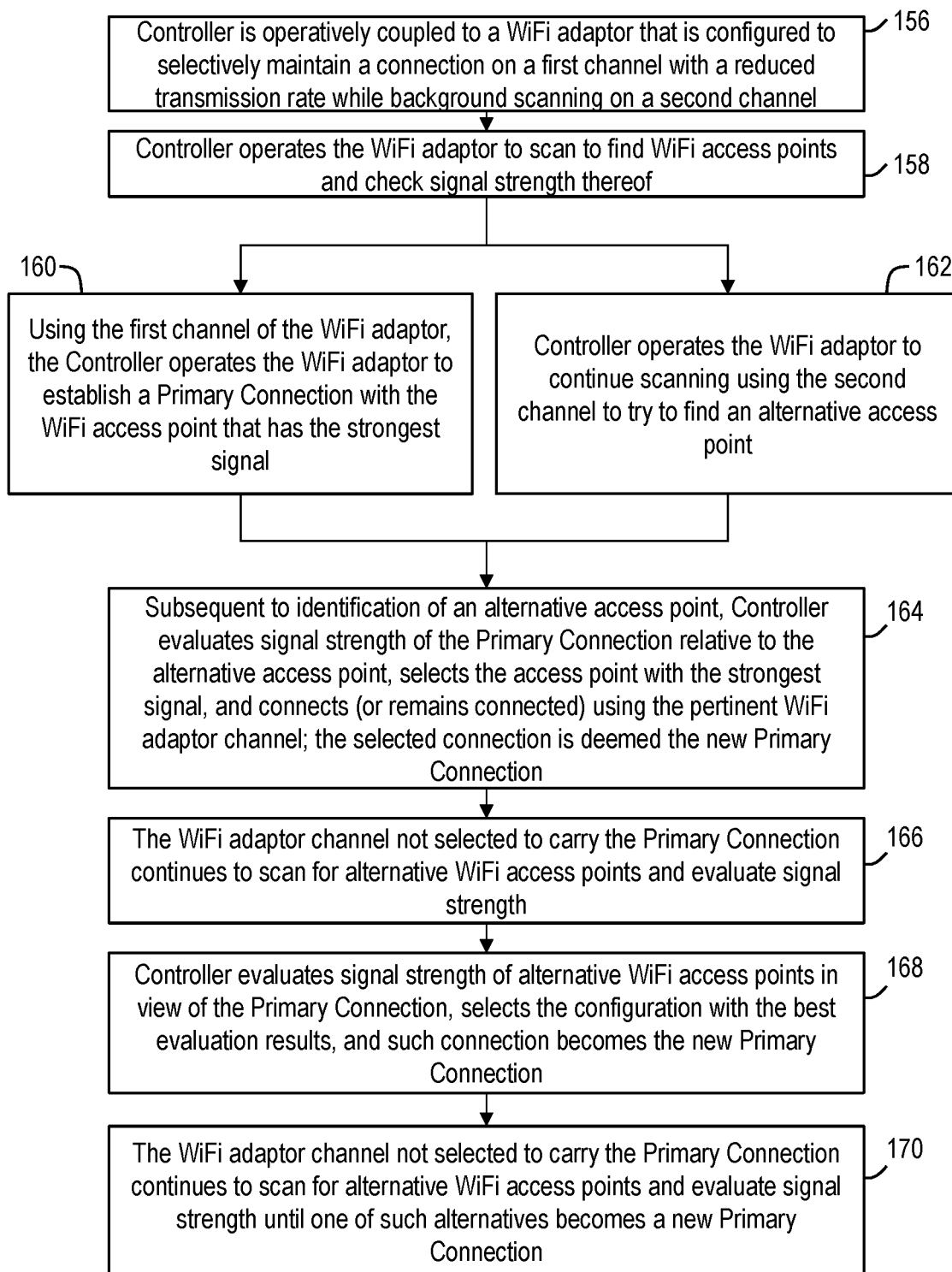
FIG. 10 depicts one embodiment of a mobile computing system having various multi-modal wireless communications capabilities that may be utilized to improve connectivity robustness and quality for a mobile computing system.

Referring to FIG. 10, an embodiment is depicted wherein a controller is operatively coupled to a single Wi-Fi adaptor that is configured to selectively maintain a connection on a first channel with a reduced transmission rate, while also being able to background scan on a second channel (157). The controller operates the adaptor to scan to find Wi-Fi access points and check upon the signal strength of connectivity with these access points (158). Using the first channel of the adaptor, the controller may operate the adaptor to establish a primary connection with the Wi-Fi access point having the greatest signal strength (160); simultaneously, the controller may also operate the adaptor to continue scanning on the second channel to try to find other suitable or alternative connectivity access points (162). Subsequent to identification of an alternative access point, the controller may evaluate the signal strengths of the connectivity options on the two channels relative to each other, and select the option with the strongest signal strength to be the primary connection (in which case the connection may remain with the previous primary connection, or may be switched to the other channel which then becomes the new primary connection) (164). The Wi-Fi adaptor not chosen to carry the primary connection may be configured to continue to scan for alternative Wi-Fi access points and to evaluate the signal strength thereof (166); such adaptor may also be configured to retain the connection it previously had, notwithstanding the fact that such connection was not chosen as the new primary—because at least in the event that the chosen primary drops out, a live secondary would be ready to activate without delay. In other words, the system may be configured such that a primary is selected and utilized as the main connection, but that the non-primary connection is retained until another nonprimary is found that has greater signal strength than the first non-primary, in which case it may be deemed worth the transition risk to move to the second non-primary, and, indeed, to compare the strength of this new non-primary to the primary to see if it should be promoted to primary. As shown in FIG. 10, the controller may evaluate the signal strength of alternatives to see if a new primary is selected (168), and the channel that scanned to the access point not chosen as primary may be utilized to continue to scan for other alternatives (170).

Figure 11:
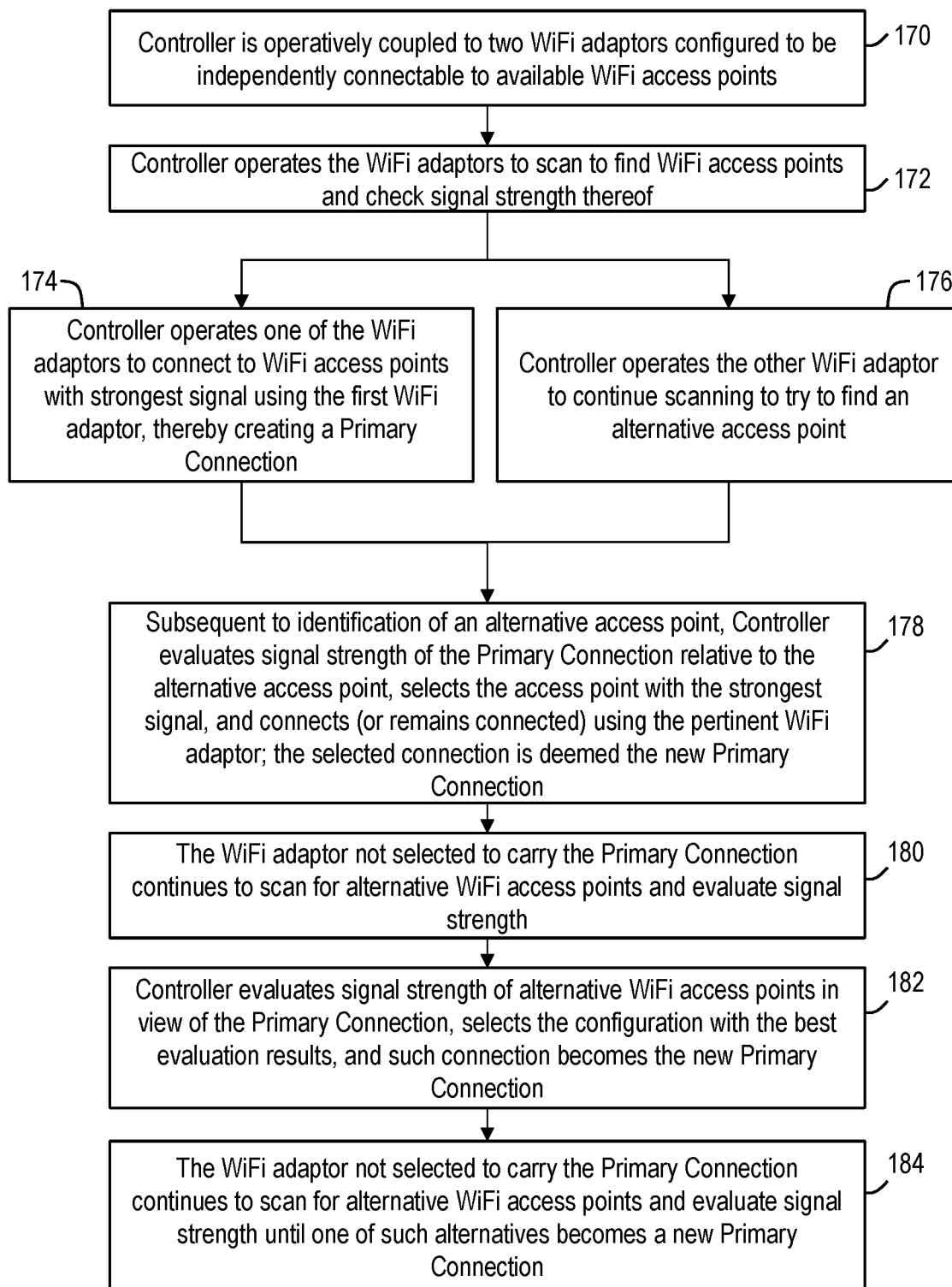
FIG. 11 depicts one embodiment of a mobile computing system having various multi-modal wireless communications capabilities that may be utilized to improve connectivity robustness and quality for a mobile computing system.

Referring to FIG. 11, another embodiment is illustrated wherein two Wi-Fi adaptors are utilized to conduct analysis and connection activity similar to the configuration described in reference to FIG. 10, but with the exception that the embodiment of FIG. 11 has multiple Wi-Fi adaptors (the embodiment of FIG. 10 had only one local Wi-Fi adaptor with multiple channels). The controller is operatively coupled to two Wi-Fi adaptors (i.e., such as in a configuration wherein two adaptors are carried on board a mobile electromechanical telepresence system, such as that (24) shown in FIG. 6B) that are configured to operate independently to connect with available Wi-Fi access points (171). The controller operates the adaptors to find access points and evaluate signal strength thereof (172). The controller connects with the strongest signal strength access point as a primary connection (174) and continues to seek other connectivity options with the other adaptor (176). The controller continues to evaluate connections, and potentially switch out the primary connection, depending upon what kind of signal strength is found in the alternatives (178, 180, 182, 184), and as with the embodiment of FIG. 10, the embodiment of FIG. 11 may be configured to not drop a secondary connection until a good alternative replacement secondary connection (which may, indeed, become a primary connection, depending upon signal strength) is identified.

Figure 12:
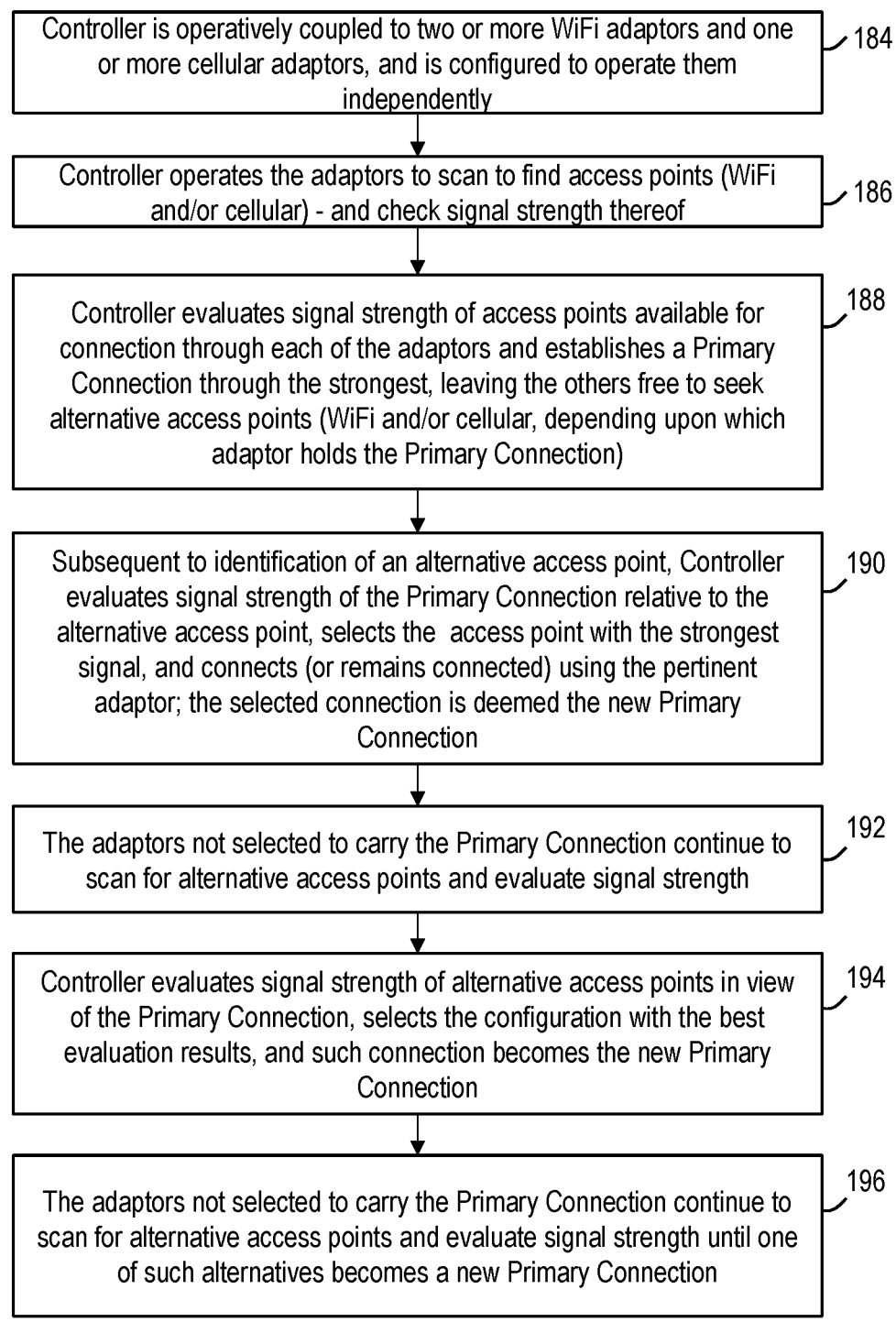
FIG. 12 depicts one embodiment of a mobile computing system having various multi-modal wireless communications capabilities that may be utilized to improve connectivity robustness and quality for a mobile computing system.

Referring to FIG. 12, in another embodiment, a controller may be operatively coupled to two or more Wi-Fi adaptors—and also one or more cellular adaptors, with a configuration to operate all of them independently (185). The controller may be configured to have all of them scan to find access points, and to check the signal strength thereof (186). The controller may evaluate the signal strength results and establish a primary connection with the strongest, leaving the other adaptors free to seek other suitable alternative connections (188). One or more of the two secondary connections may remain connected to one or more of the access points not chosen as the primary to provide non-latent redundancy for the primary. A cycle of continued scanning, signal strength analysis, and selection of an access point to carry the primary connection may be continued, as shown (190, 192, 194, 196).

Figure 13:
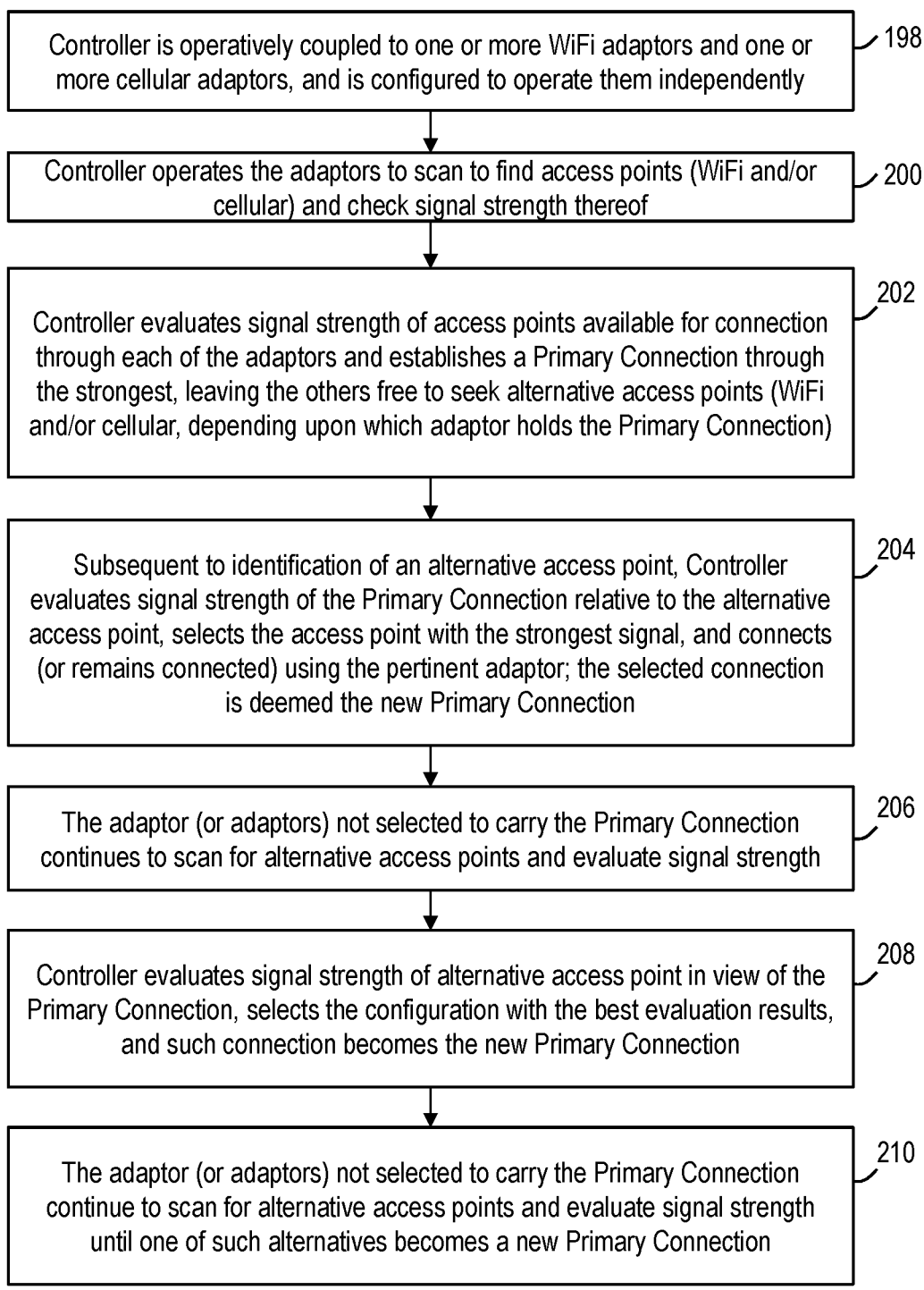
FIG. 13 depicts one embodiment of a mobile computing system having various multi-modal wireless communications capabilities that may be utilized to improve connectivity robustness and quality for a mobile computing system.

Referring to FIG. 13, an embodiment similar to that of FIG. 12 is shown, but with only one Wi-Fi adaptor local to the controller (198). A similar process of scanning for possible connections to outside access points, evaluating signal strength, and selecting the connection with the highest signal strength to carry the primary connection while the other adaptor continues to search for other alternatives may be utilized (200, 202, 204, 206, 208, 210).

Figure 14:
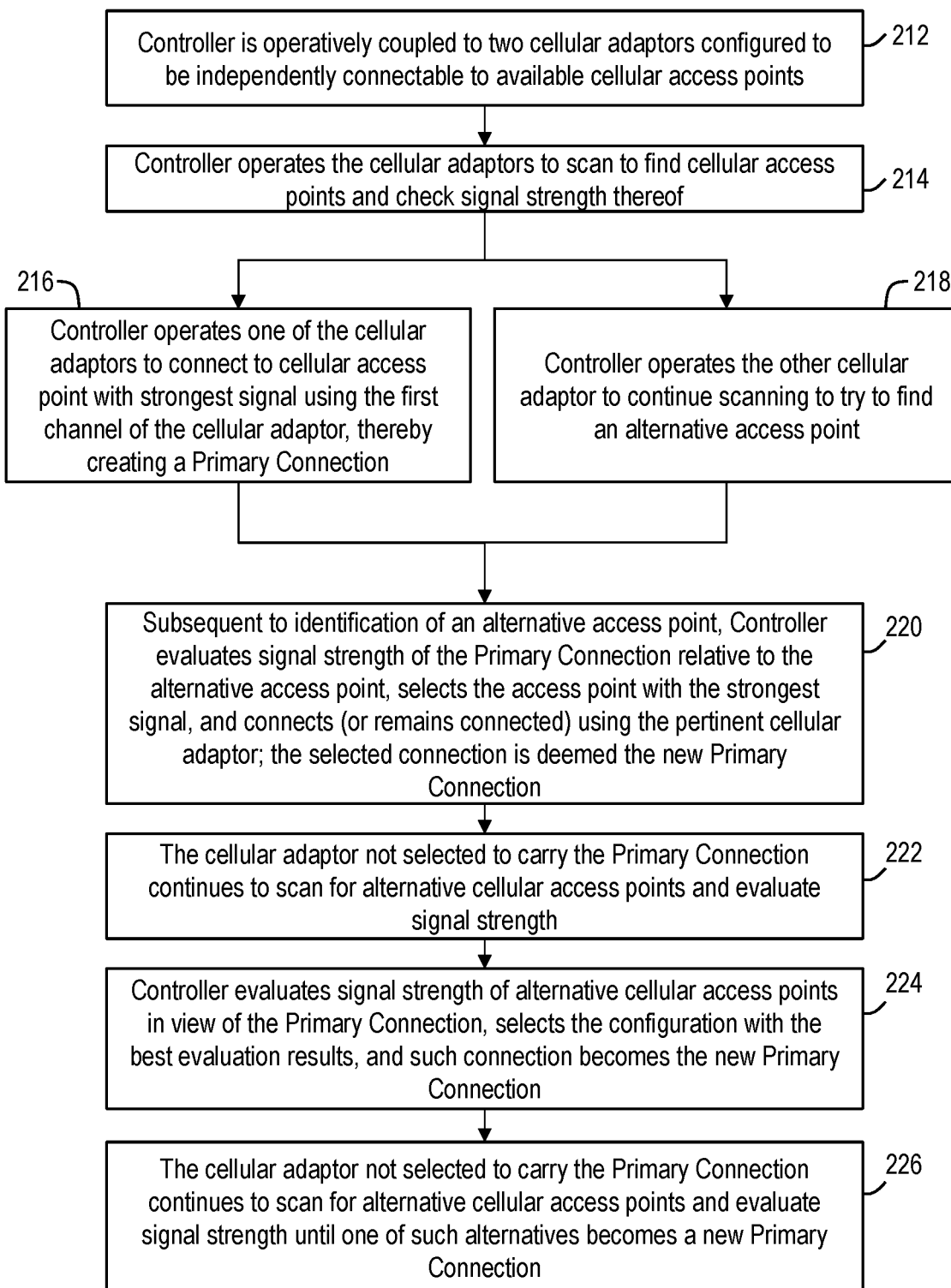
FIG. 14 depicts one embodiment of a mobile computing system having various multi-modal wireless communications capabilities that may be utilized to improve connectivity robustness and quality for a mobile computing system.

Referring to FIG. 14, an embodiment similar to that of FIG. 11 is shown, but with two mobile (i.e., cellular wireless network) adaptors local to the controller (212). A similar process of scanning for possible connections to outside access points, evaluating signal strength, and selecting the connection with the highest signal strength to carry the primary connection while the other adaptor continues to search for other alternatives may be utilized (214, 216, 218, 220, 222, 224, 226)

Referring to FIGS. 15-19, configurations featuring a two-phase analysis are depicted, wherein a first level of connectivity analysis (signal strength comparison) is conducted before connecting to a remote controller or server. After connection, a second level of connectivity analysis may be conducted (based upon factors such as latency, packet loss, financial expense of the particular connection, etc.) to complete the analysis and selection of a primary connection, after which a cyclic pattern may be conducted to continually update the configuration with an optimized primary connectivity scenario.

Figure 15:
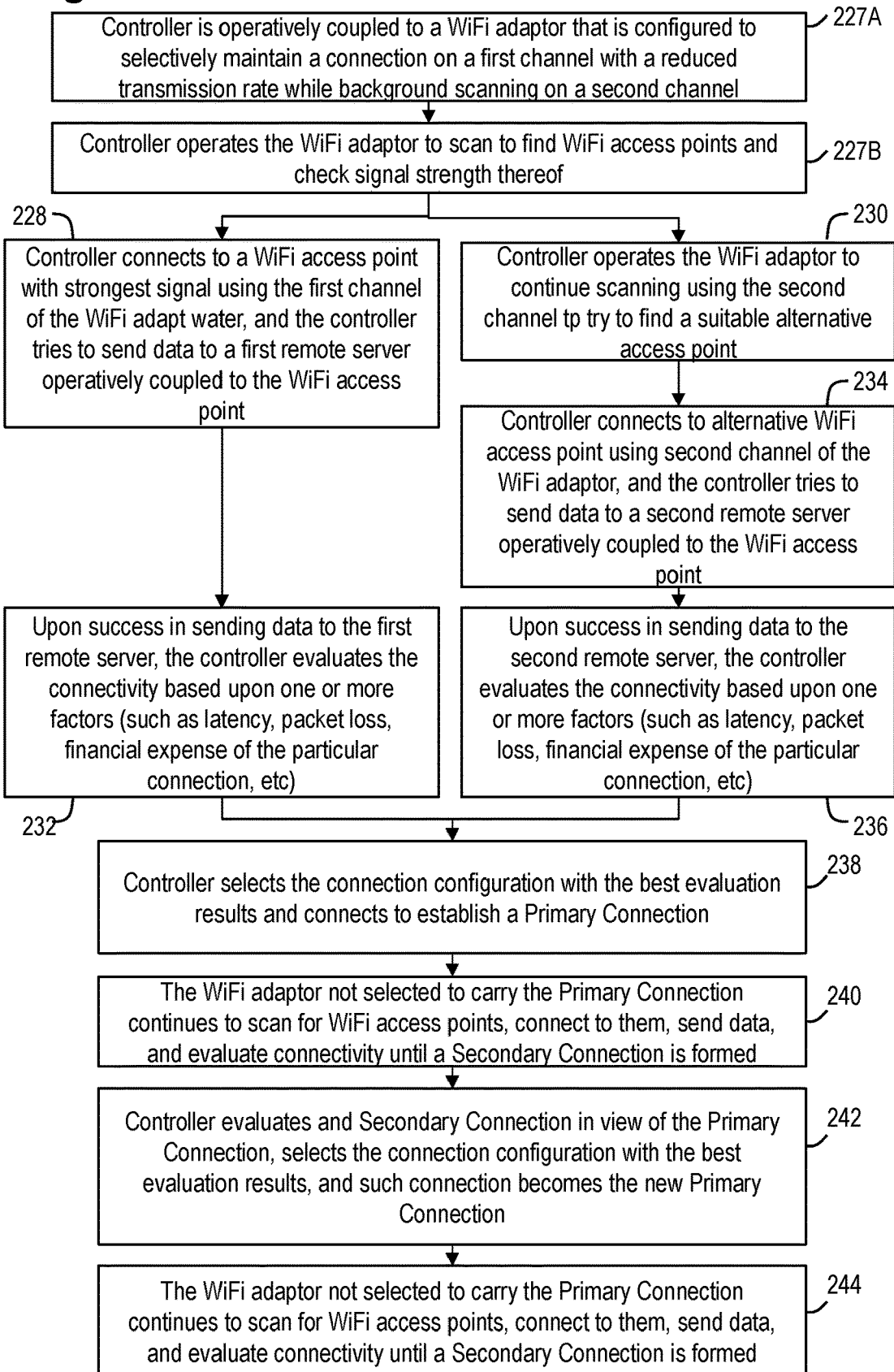
FIG. 15 depicts one embodiment of a mobile computing system having various multi-modal wireless communications capabilities that may be utilized to improve connectivity robustness and quality for a mobile computing system.

Referring to FIG. 15, a two-phase analysis configuration is illustrated featuring a controller operatively coupled to a single Wi-Fi adaptor with multi-channel connectivity capability (227A). The controller scans for access points and checks signal strength thereof (227B). The controller may be configured to the access point to the strongest signal strength (228), and to then send data to a remote server through the connection for the purposes of further connectivity analysis based upon factors such as latency, packet loss, financial expense of the particular connection, etc.) (232). For example, utilities such as that marketed as "MTR" may be utilized; MTR is a diagnostic tool that combines "ping" timing analysis and "traceroute" route analysis functionalities into a single diagnostic application. Simultaneously and automatically, the controller may operate the Wi-Fi adaptor to use the other channel to find another alternative connection, analyze signal strength, connect, and evaluate the connectivity (230, 234, 236). The controller may be configured to deem the primary connection the one that has the best evaluation results (238), and to continue to utilize the other channel to seek alternatives, conduct the two-stage analysis of them, and potentially switch out the primary connection—to continually optimize the connection being utilized as the primary (240, 242, 244).

Figure 16:
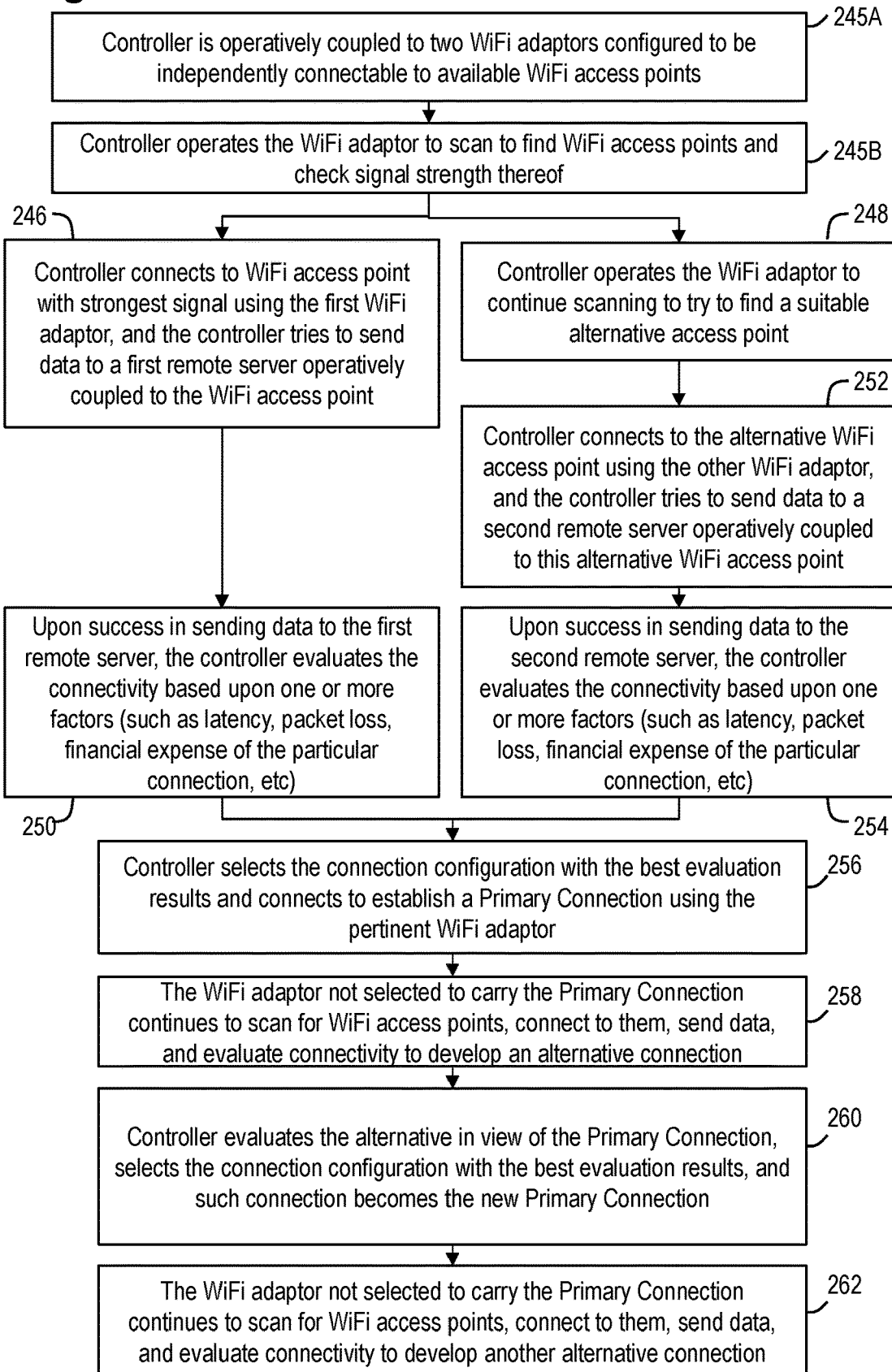
FIG. 16 depicts one embodiment of a mobile computing system having various multi-modal wireless communications capabilities that may be utilized to improve connectivity robustness and quality for a mobile computing system.

Referring to FIG. 16, an embodiment similar to that of FIG. 15 is illustrated, with the exception that the embodiment of FIG. 16 features multiple independent Wi-Fi adaptors instead of a single Wi-Fi adaptor with multi-channel capability (245A). The controller may be configured to scan the Wi-Fi adaptors for alternatives and to check signal strength (245B), then conduct repeated rounds of further analysis of the connectivity (246, 248, 250, 252, 254, 256, 258, 260, 262), with the objective again being to continually optimize connectivity by selecting carefully the connection being utilized as the primary.

Figure 17:
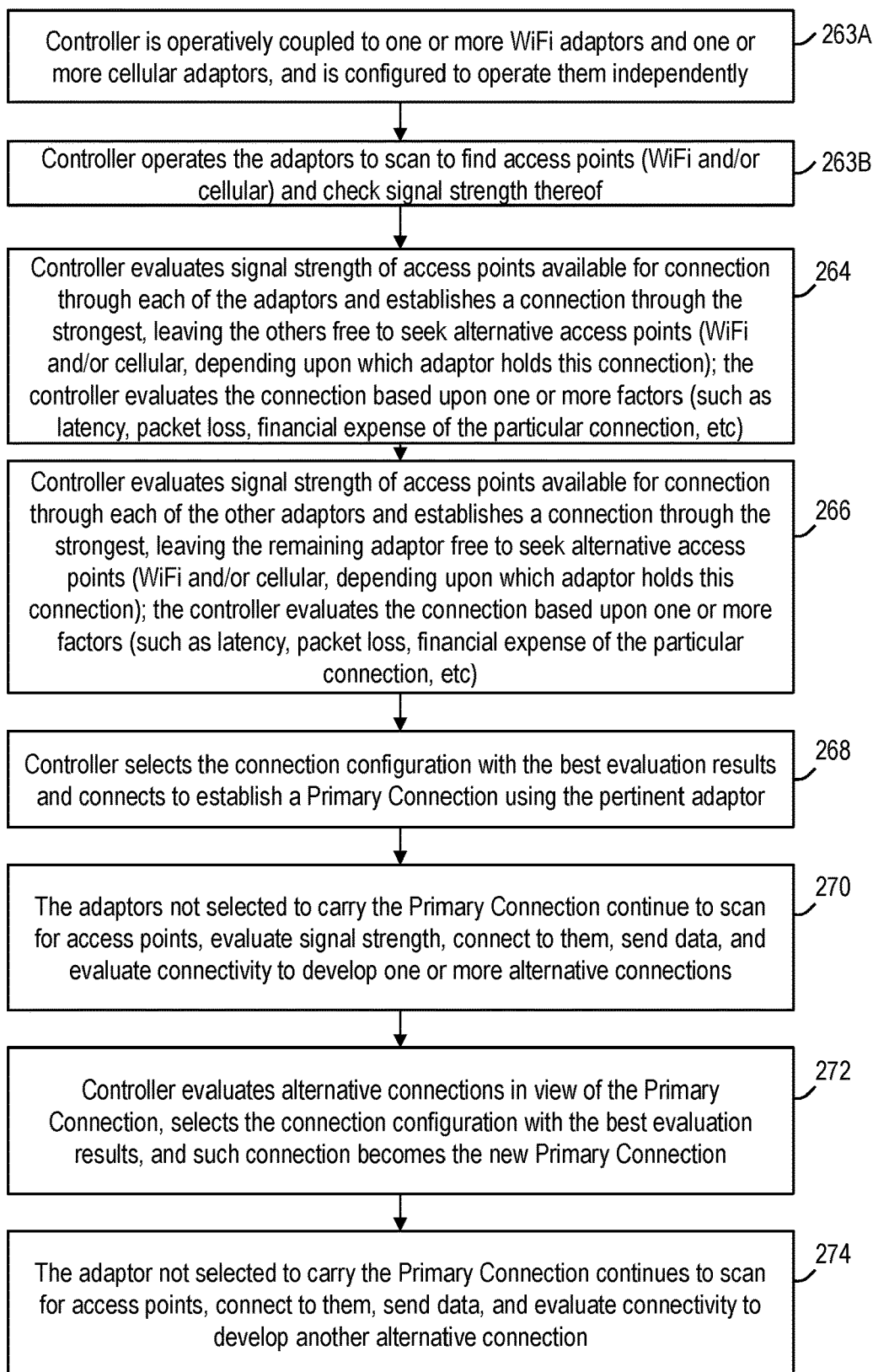
FIG. 17 depicts one embodiment of a mobile computing system having various multi-modal wireless communications capabilities that may be utilized to improve connectivity robustness and quality for a mobile computing system.

Referring to FIG. 17, an embodiment similar to that of FIG. 16 is illustrated, with the exception that the controller of the embodiment in FIG. 17 is operatively coupled to two or more Wi-Fi adaptors, and also to one or more cellular (i.e., mobile wireless) adaptors (263A). The controller is configured to scan all available adaptors to seek connectivity options that have both high signal strength (263B) and also solid connection evaluation results based upon factors such as latency, packet loss, and financial expense of connectivity), while cycling through such analysis to continually optimize connectivity by selecting carefully the connection being utilized as the primary (264, 266, 268, 270, 272, 274).

Figure 18:
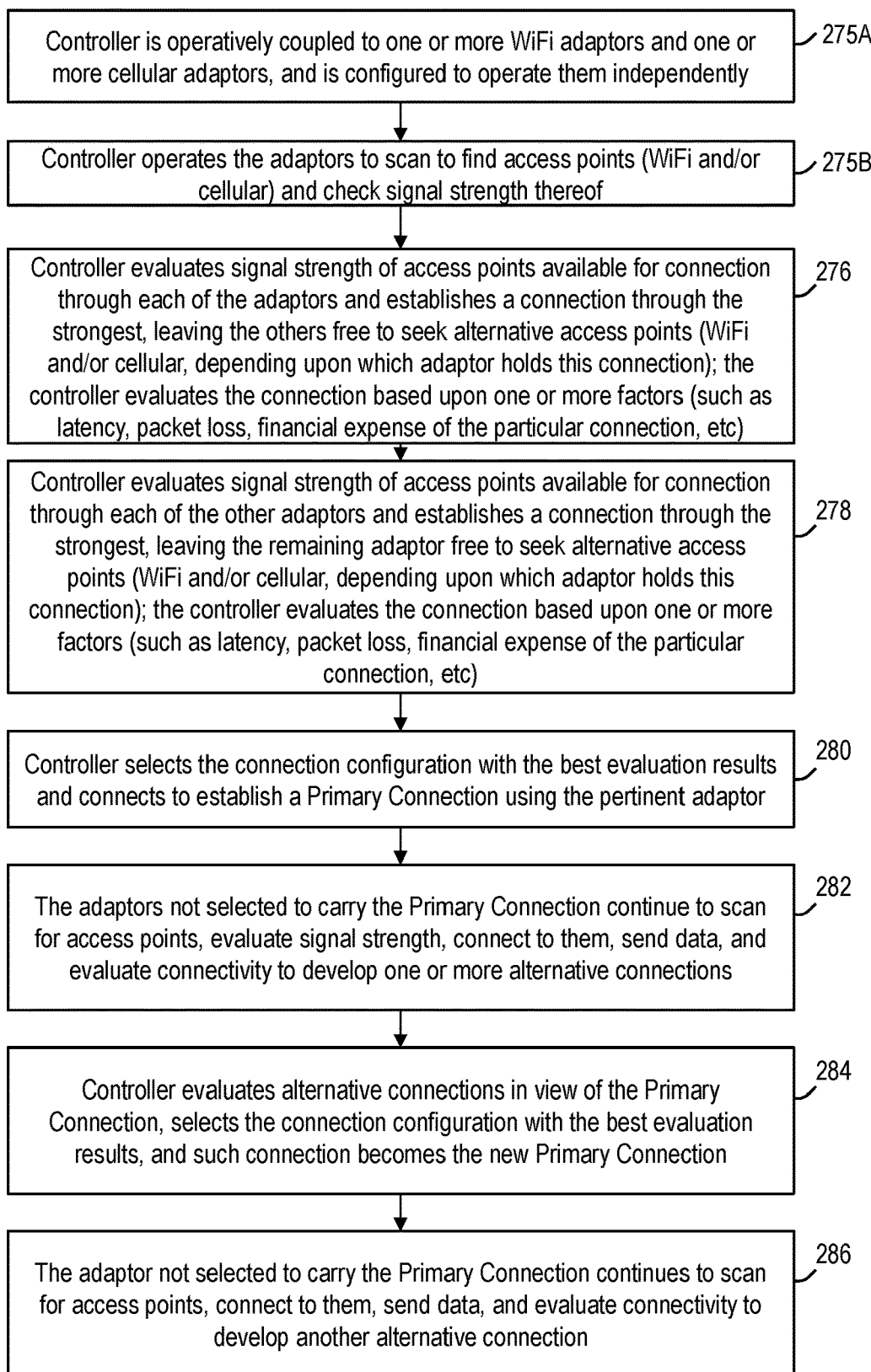
FIG. 18 depicts one embodiment of a mobile computing system having various multi-modal wireless communications capabilities that may be utilized to improve connectivity robustness and quality for a mobile computing system.

FIG. 18 illustrates an embodiment similar to that of FIG. 17, with the exception that the controller is operatively coupled to one or more cellular adaptors, and one Wi-Fi adaptor (275A). The controller is configured to scan all available adaptors to seek connectivity options that have both high signal strength (275B) and also solid connection evaluation results based upon factors such as latency, packet loss, and financial expense of connectivity), while cycling through such analysis to continually optimize connectivity by selecting carefully the connection being utilized as the primary (276, 278, 280, 282, 284, 286).

Figure 19:
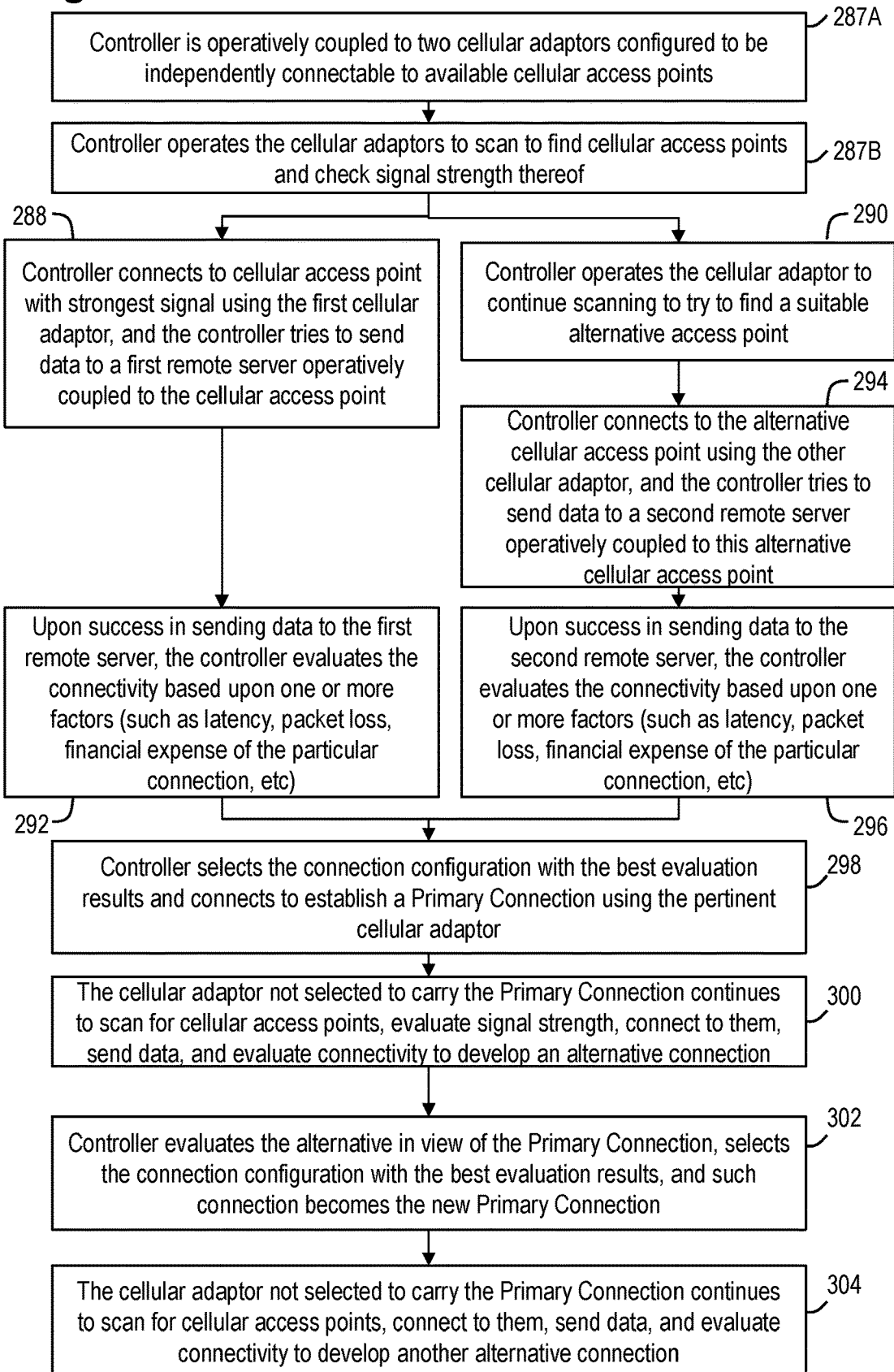
FIG. 19 depicts one embodiment of a mobile computing system having various multi-modal wireless communications capabilities that may be utilized to improve connectivity robustness and quality for a mobile computing system.

FIG. 19 illustrates an embodiment similar to those of FIGS. 16-18, with the exception that the controller is operatively coupled to two cellular adaptors, and no Wi-Fi adaptors (287A). For example, in one embodiment, one cellular adaptor may be on a different provider network than the other. The controller is configured to scan all available adaptors to seek connectivity options that have both high signal strength (287B) and also solid connection evaluation results based upon factors such as latency, packet loss, and financial expense of connectivity), while cycling through such analysis to continually optimize connectivity by selecting carefully the connection being utilized as the primary (288, 290, 292, 294, 296, 298, 300, 302, 304).

Figure 20:
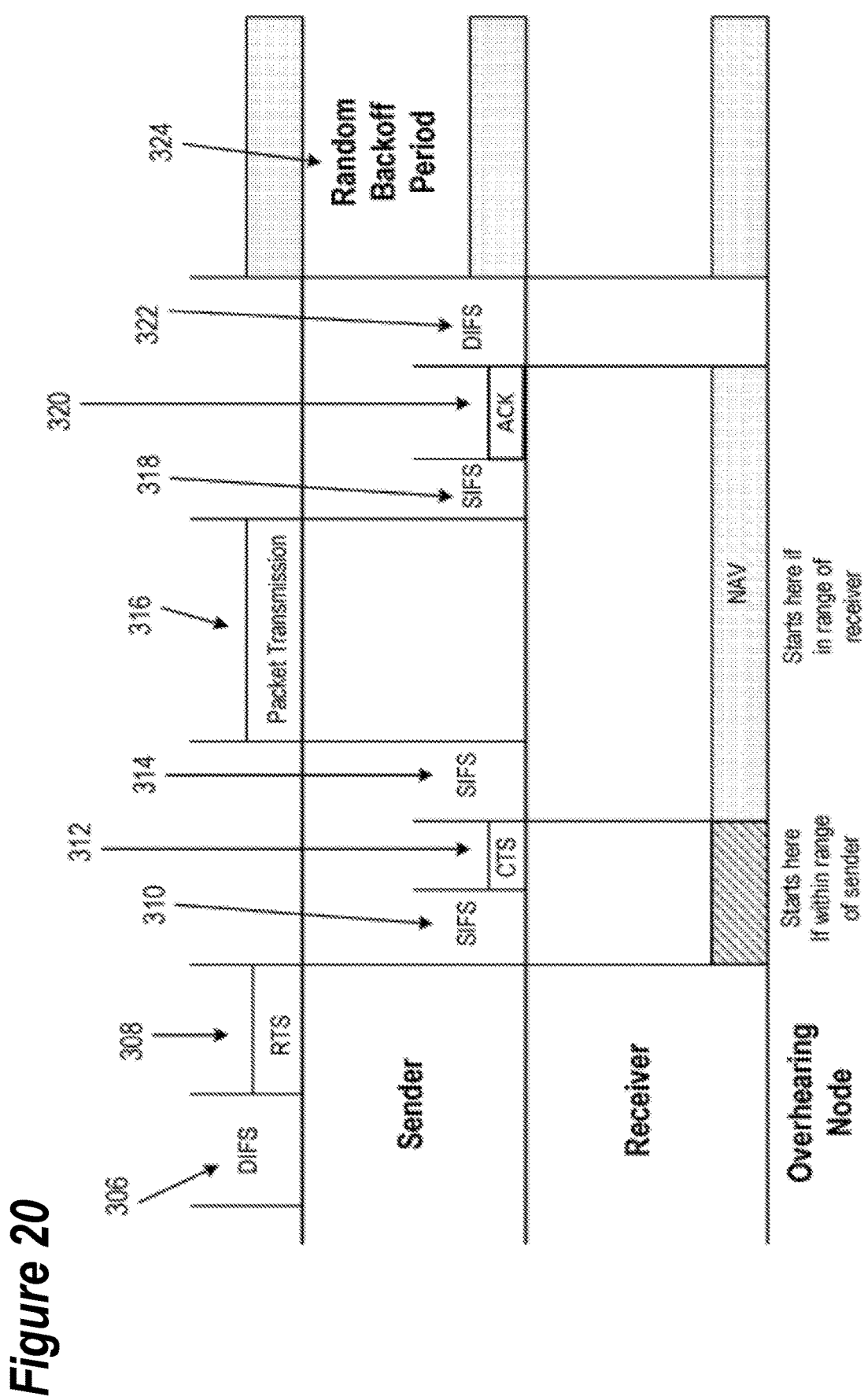
FIG. 20 illustrates an IEEE 802.11 distributed coordination function protocol data transmission timing diagram.
Figure 21:
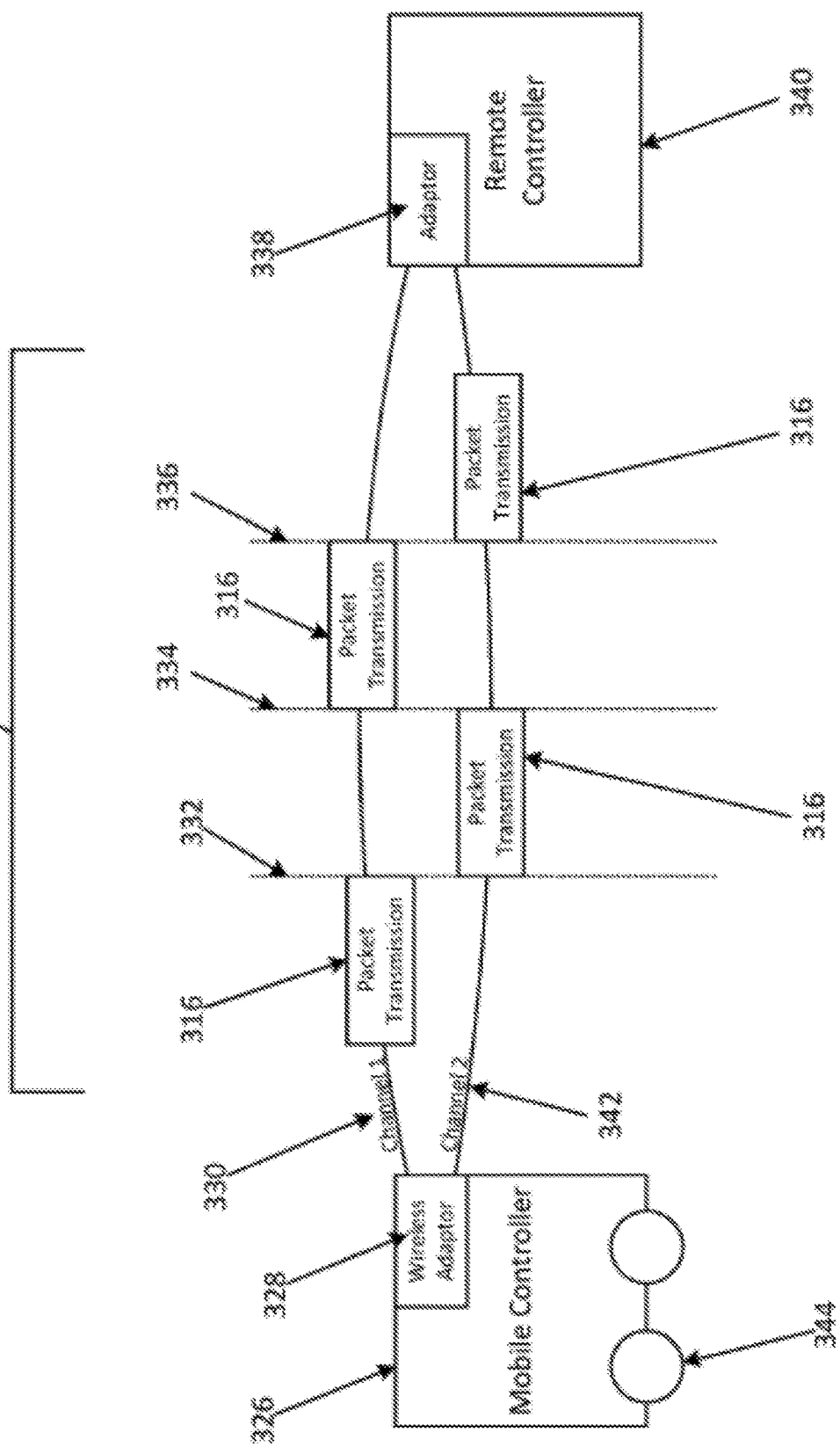
FIG. 21 illustrates one embodiment wherein a multi-modal communication configuration may be utilized to time-multiplex data transmissions to yield efficiency and redundancy.

Referring to FIG. 20, an IEEE 802.11 distributed coordination function ("DCF") protocol timing diagram is depicted to illustrate that a typical 802.11 data transmission (316) is associated with certain wait times or wait periods (306, 322—DCF interframe spacing period "DIFS", 308—request to send period "RTS", 310, 314 and 318—short interframe spacing period "SIFS", 312—clear to send period "CTS", 320—acknowledgement period "ACK", 324—random backoff period) that are at least somewhat predictable, and which may be utilized in a time-multiplexed communication configuration. For example, referring to FIG. 21, a multi-channel (330, 342) single Wi-Fi (328) configuration is shown such as that which may be utilized in accordance with the embodiments of FIG. 3, 10, or 15. To minimize packet collision and maximize the use of bandwidth between the mobile controller (326—wheels 344) and the remote controller (340—such as a remote server), packet transmission (316) timing (346) may be multiplexed or timed as shown. In other words, with a multichannel configuration and a single adaptor, to maximize the efficiency of primary and background scanning and transmission, time multiplexing as shown may be utilized.

Various exemplary embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

Any of the devices described for carrying out the subject diagnostic or interventional procedures may be provided in packaged combination for use in executing such interventions. These supply "kits" may further include instructions for use and be packaged in containers as commonly employed for such purposes.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

The invention claimed is:

1. A system for maintaining wireless connectivity between a mobile controller and a remote controller, the system comprising:

a wireless adaptor operatively coupled between the mobile controller and each of a first wireless access point and a second wireless access point, each of which is operatively coupled to the remote controller, the wireless adaptor having a single wireless transmitter, the wireless adaptor configured to have a timing-multiplexed operational mode wherein the wireless connectivity is maintained between the mobile controller and the remote controller on both a first channel to the first wireless access point, and a second channel to the second wireless access point, such that a data transmission between the mobile controller and the remote controller is switched between the first channel and the second channel based at least in part upon data transmission timing gaps associated with a protocol that is operated by the wireless adaptor and the first and second wireless access points, wherein in a background scanning mode, data is alternated in bit packets based upon a bit packet size through the single wireless transmitter from both the first channel and the second channel;

wherein the mobile controller is configured at a first time to operate the wireless adaptor to automatically:

scan to find available wireless access points;

connect to the remote controller through the first wireless access point with the first channel and evaluate a connectivity of the first channel connection by sending first data via the first channel through the first wireless access point to a first remote server;

while retaining the first channel connection with the remote controller through the first channel using the timing-multiplexed operational mode of the wireless adaptor, connect to the remote controller in the background scanning mode through the second wireless access point with the second channel and evaluate connectivity of the second channel connection by sending second data via the second channel through the second wireless access point to a second remote server, compare the evaluated connectivities of the first and second channels to find a highest evaluated channel and a lowest evaluated channel, and while maintaining the wireless connectivity between the mobile controller and the remote controller, switching, based on comparing the evaluated connectivities of the first and second channels, from the lowest evaluated channel to the highest evaluated channel while proceeding to continually optimize a connection being used as a primary connection by scanning to find additional available wireless access points and evaluate connectivities of the connections with the additional available wireless access points;

wherein the mobile controller is configured to operatively couple the wireless adaptor between the mobile controller and each of the second wireless access point and a third wireless access point, the second and third wireless access points being operatively coupled to the remote controller, and configure the wireless adaptor to have the timing-multiplexed operational mode wherein the wireless connectivity is maintained between the mobile controller and the remote controller on both the second channel to the second wireless access point, and a third channel to the third wireless access point, such that another data transmission between the mobile controller and the remote controller is switched between the second channel and the third channel based at least in part on data transmission timing gaps associated with the protocol that is operated by the wireless adaptor and the second and third wireless access points, and wherein the mobile controller is configured at a second time to operate the wireless adaptor to automatically:

continue to scan to find the additional available wireless access points;

connect to the remote controller in the background scanning mode through the second wireless access point with the second channel and evaluate the connectivity of the second channel connection by sending additional second data via the second channel through the second wireless access point to the second remote server;

while retaining the wireless connectivity with the remote controller through the second channel using the timing-multiplexed operational mode of the wireless adaptor, connect to the remote controller in the background scanning mode through the third wireless access point with the third channel and evaluate a connectivity of the third channel connection by sending third data via the third channel through the third wireless access point to a third remote server, compare the evaluated connectivities of the second and third channels to find a next highest evaluated channel and a next lowest evaluated channel, and while maintaining the wireless connectivity between the mobile controller and the remote controller, switching, based on comparing the evaluated connectivities of the second and third channels, the primary connection from the next lowest evaluated connection channel to the next highest evaluated channel while proceeding to continually optimize the connection being used as the primary connection by scanning to find additional available wireless access points and evaluate connectivities of the connections with the additional available wireless access points.

2. The system of claim 1, wherein the single wireless transmitter is a radio frequency (RF) antenna.

3. The system of claim 1, wherein the data is alternated based upon a time interval.

4. The system of claim 1, wherein the bit packet size is predetermined.

5. The system of claim 1, wherein the bit packet size is adjustable using the mobile controller.

6. The system of claim 3, wherein the time interval is predetermined.

7. The system of claim 3, wherein the time interval is adjustable using the mobile controller.

8. The system of claim 1, wherein the wireless adaptor is compatible with an IEEE 802.11 standard selected from a group consisting of: 802.11A, 802.11B, 802.11G, and 802.11N.

9. The system of claim 1, wherein the wireless adaptor is a cellular telephone adaptor.

10. The system of claim 1, wherein the wireless adaptor is an IEEE 802.16 compatible adaptor.

11. The system of claim 1, wherein the wireless adaptor is a free-space optical adaptor.

12. The system of claim 1, wherein the mobile controller is configured to operate the wireless adaptor to scan using a discrete frequency band.

13. The system of claim 12, wherein the discrete frequency band is selected based upon a determined prevalence of active wireless access points.

14. The system of claim 1, wherein the mobile controller is configured to scan again to find available wireless access points after disconnecting connectivity between the mobile controller and the remote controller through the lowest evaluated channel.

15. The system of claim 1, wherein the mobile controller is configured to repeatedly cycle between scanning to find available wireless access points and disconnecting connectivity between the mobile controller and the remote controller through the lowest evaluated channel.

16. The system of claim 15, wherein the mobile controller is configured to repeatedly cycle at a frequency between 100 cycles/second and ½ cycles/second.

17. The system of claim 1, wherein the mobile controller is coupled to a motorized vehicle.

18. The system of claim 17, wherein the motorized vehicle comprises a robot.

19. The system of claim 1, wherein the mobile controller is configured to evaluate the connectivity of the connection with the first or second channel based at least in part upon a factor selected from a group consisting of: latency, packet loss, and financial cost of connectivity.

20. The system of claim 1, wherein the mobile controller further is configured to operate the wireless adaptor to automatically disconnect connectivity between the mobile controller and the remote controller through the lowest evaluated channel.

21. The system of claim 1, wherein at least one of the data transmission timing gaps is based upon an IEEE 802.11 distributed coordination function timing protocol.

22. The system of claim 21, wherein at least one of the data transmission timing gaps represents a protocol element selected from a group consisting of: a random backoff period, a distributed coordination function (DCF) interframe spacing period, a request to send period, a short interframe spacing period, a clear to send period, and an acknowledgement period.

* * * * *